US012731353B2

(12) United States Patent
Bae et al.

(10) Patent No.: US 12,731,353 B2
(45) Date of Patent: Sep. 8, 2026

(54) ELECTRONIC DEVICE FOR CARRYING OUT THREE-DIMENSIONAL SKETCHING AND OPERATION METHOD THEREOF

(71) Applicant: KOREA ADVANCED INSTITUTE OF SCIENCE AND TECHNOLOGY, Daejeon (KR)

(72) Inventors: Seok Hyung Bae, Daejeon (KR); Joon Hyub Lee, Daejeon (KR); Han Bit Kim, Daejeon (KR)

(73) Assignee: KOREA ADVANCED INSTITUTE OF SCIENCE AND TECHNOLOGY, Yuseong-Gu (KR)

( * ) Notice: Subject to any disclaimer, the term of this patent is extended or adjusted under 35 U.S.C. 154(b) by 337 days.

(21) Appl. No.: 18/692,193

(22) PCT Filed: Sep. 14, 2022

(86) PCT No.: PCT/KR2022/013684
§ 371 (c)(1),
(2) Date: Oct. 10, 2024

(87) PCT Pub. No.: WO2023/043168
PCT Pub. Date: Mar. 23, 2023

(65) Prior Publication Data

US 2025/0037399 A1 Jan. 30, 2025

(30) Foreign Application Priority Data

Sep. 14, 2021 (KR) ........................ 10-2021-0122288

(51) Int. Cl.
*G06T 19/20* (2011.01)

(52) U.S. Cl.
CPC ...... *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS 10,019,440 B2 7/2018 Joshi et al.
2013/0127825 A1 5/2013 Joshi
(Continued)

FOREIGN PATENT DOCUMENTS

KR 100960134 B1 5/2010
KR 20190036061 A 4/2019
(Continued)

OTHER PUBLICATIONS

Kev Binge, "Blender 2.8—How To Change the Pivot Point," Youtube, accessed at https://www.youtube.com/watch?v=RGrXpBB_ekk&t=14s on Mar. 30, 2026, Nov. 8, 2018.*
(Continued)

*Primary Examiner* — Michael J Hess
(74) *Attorney, Agent, or Firm* — HOLZER PATEL DRENNAN

(57) ABSTRACT

Disclosed are an electronic device for carrying out three-dimensional sketching, an electronic device, and an operating method thereof. The disclosed electronic device comprises at least one processor which arranges a reference plane onto a three-dimensional virtual space including an object expressed by a plurality of lines, and generates a joint, which applies to a first part of the object, on the basis of repetitive movement of the first part overlapping with the reference plane, while a first touch input by a user on the reference plane is being maintained. The joint is determined according to the component type of the reference plane to which the first touch input is inputted, and the number of second touch inputs, of the user, for controlling the repetitive movement of the first part.

20 Claims, 25 Drawing Sheets

(56) References Cited

U.S. PATENT DOCUMENTS

| | | | | |
|---|---|---|---|---|
| 2016/0188181 | A1* | 6/2016 | Smith | G06F 3/04886 715/765 |
| 2017/0098065 | A1* | 4/2017 | Vaughn | G06F 21/316 |
| 2017/0285920 | A1* | 10/2017 | Hatfield | G06F 3/04845 |
| 2017/0358144 | A1* | 12/2017 | Schwarz | G06F 3/017 |
| 2018/0121075 | A1* | 5/2018 | Resendez Rodriguez | G06V 30/347 |
| 2019/0043240 | A1* | 2/2019 | Finegold | G06F 3/04883 |
| 2019/0354279 | A1* | 11/2019 | Feinberg | G06F 3/04855 |

FOREIGN PATENT DOCUMENTS

| | | | |
|---|---|---|---|
| KR | 20200122126 | A | 10/2020 |
| WO | 2013060085 | A1 | 5/2013 |

OTHER PUBLICATIONS

DavidRBeach—The Architect's Digital Design Guide, "Object Pivot and Parent in 3ds Max," YouTube, accessed at https://www.youtube.com/watch?v=FlgRBrbizk4 on Mar. 30, 2026, Sep. 28, 2012.*

CrookedPoe, "How to Create a Basic Armature and Animate it in Blender 2.75 [Considerably Easy]," accessed at https://www.youtube.com/watch?v=CDZ9f9vwkgw on Mar. 30, 2026, Oct. 23, 2015.*

Lee, Joon Hyub , "3D Sketching for Multi-Pose Products", CHI 2020 Late-Breaking, Apr. 25, 2020, 1-8.

Lee, Joon Hyub, et al., "Rapid Design of Articulated Objects", ACM Trans. Graph, vol. 41, No. 4, Article 89, Jul. 2022.

* cited by examiner

ELECTRONIC DEVICE FOR CARRYING OUT THREE-DIMENSIONAL SKETCHING AND OPERATION METHOD THEREOF

TECHNICAL FIELD

The following description relates to an electronic device for performing three-dimensional sketching and an operating method thereof.

BACKGROUND ART

Various products have movable parts, and the products may change to various poses through the movement of the parts. The products having various poses have various shapes depending on the poses. Due to the changing shapes according to movements, designers of those products should consider shape and movement together.

However, it is difficult to consider both shape and movement while exploring ideas through sketching at an initial design stage. The changing shapes according to movements are not easily imaginable, and sketching various shapes of a product one by one is time-consuming. If ideas are not sufficiently explored in a sketching process, a product that does not move as intended or that changes to an unexpected shape may be designed.

DISCLOSURE OF THE INVENTION

Technical Solutions

According to an aspect, there is provided an electronic device including one or more processors configured to place a reference plane in a three-dimensional (3D) virtual space including an object expressed by a plurality of lines, and generate a joint applied to a first part, based on a repetitive movement of the first part of the object overlapping the reference plane, while a first touch input by a user to the reference plane is being maintained, in which the joint is determined based on a component type of the reference plane to which the first touch input is input and the number of second touch inputs, which are configured to control the repetitive movement of the first part, by the user.

The second touch inputs may be a touch input to the first part overlapping the reference plane.

The repetitive movement of the first part may be performed based on the reference plane.

The one or more processors may generate a hinge joint where the first part rotates around an axis of the reference plane in response to the first touch input being input to the axis set for the reference plane and there being one second touch input.

The one or more processors may generate a linear slider where the first part has a linear movement along an axis of the reference plane in response to the first touch input being input to the axis set for the reference plane and there being a plurality of second touch inputs or may generate a linear slider where the first part has a linear movement on the reference plane in response to the first touch input being input to a surrounding region set for the reference plane and there being one second touch input.

The one or more processors may generate a curved slider where the first part has a curved movement according to the repetitive movement in response to the first touch input being input to a surrounding region set for the reference plane and there being a plurality of second touch inputs.

The one or more processors may generate a ball joint where the first part spherically rotates around a center point in response to the first touch input being input to the center point set for the reference plane and there being one second touch input or a plurality of second touch inputs.

The one or more processors may generate the joint configured to connect a second part to the first part, in which the second part is adjacent to the first part to which the joint is applied and is a reference for the repetitive movement of the first part.

The first part may be set to a child part of the second part, and the second part may be set to a parent part of the first part.

The one or more processors may determine a movement range of the joint, based on the repetitive movement of the first part.

The one or more processors may rotate or translate the reference plane around an axis according to a tap and drag input in response to the tap and drag input to a middle region set for the reference plane being input by the user while the first touch input by the user to the axis set for the reference plane is being maintained.

The one or more processors may rotate and/or translate the reference plane on the reference plane according to a tap and drag input in response to the tap and drag input to a middle region set for the reference plane being input by the user while the first touch input by the user to a surrounding region set for the reference plane is being maintained.

The one or more processors may orbit and/or spin the reference plane around a center point according to a tap and drag input in response to the tap and drag input to a middle region set for the reference plane being input by the user while the first touch input by the user to the center point set for the reference plane is being maintained.

The one or more processors may control one or more movements of a plurality of parts of the object and determine a plurality of poses of the object and may control a movement of the object, changing from a first pose to a second pose among the plurality of poses, according to a tap and drag input that is input by the user.

The one or more processors may determine a target part which the user desires to move among the plurality of parts of the object and a reference part that is a reference for a movement of the target part and may activate at least some of one or more joints between the reference part and the target part and move the target part by control of the user.

The one or more processors may set some lines selected by the user among the plurality of lines expressing the object as one part.

The one or more processors may draw a line on the reference plane according to a pen input that is input by the user.

The first touch input may be input by a non-dominant hand of the user, and the second touch inputs may be input by a dominant hand of the user.

According to another aspect, there is provided an operating method of an electronic device including placing a reference plane in a 3D virtual space including an object expressed by a plurality of lines and generating a joint applied to a first part, based on a repetitive movement of the first part of the object overlapping the reference plane, while a first touch input by a user to the reference plane is being maintained, in which the joint is determined based on a component type of the reference plane to which the first touch input is input and the number of second touch inputs, which are configured to control the repetitive movement of the first part, by the user.

Effects

According to an aspect, there is provided an electronic device for designing a product having various poses in one organic workflow. Users may sketch a three-dimensional (3D) line that freely poses and is easily viewed from different directions. The users may sketch parts that are connected in a chain and move, may reflect changes on other poses and perspectives without extra effort, and may visualize movement changing to and from various poses. Through a 2D perspective sketching technique familiar to the users and an intuitive multitouch interaction very similar to the physical manipulation of a joint, multi-pose products may be ideated in an initial design stage, such ideation may be repeated and modified, and the results of repetition and modification may be shared to effectively reduce trial and error to be experienced during an advancement process.

According to another aspect, there is provided a 3D sketching technique that uses the principle of intuitive double-handed multitouch interaction similar to a physical manipulation method of a joint conforming to a kinematic chain model and may be easily used by users. By using it, double-handed multitouch interaction for manipulating 6 degrees of freedom of a reference plane may be used easily and quickly.

According to an embodiment, the users may easily learn a method and device for 3D sketching and may intuitively use them. Animated sketches may provoke new ideas, and whether the ideas are feasible in various poses may be easily found out. Each function may be intuitively and simply controlled by the movement of a pen or a hand at any time during sketching.

BEST MODE FOR CARRYING OUT THE INVENTION

Figure 1:
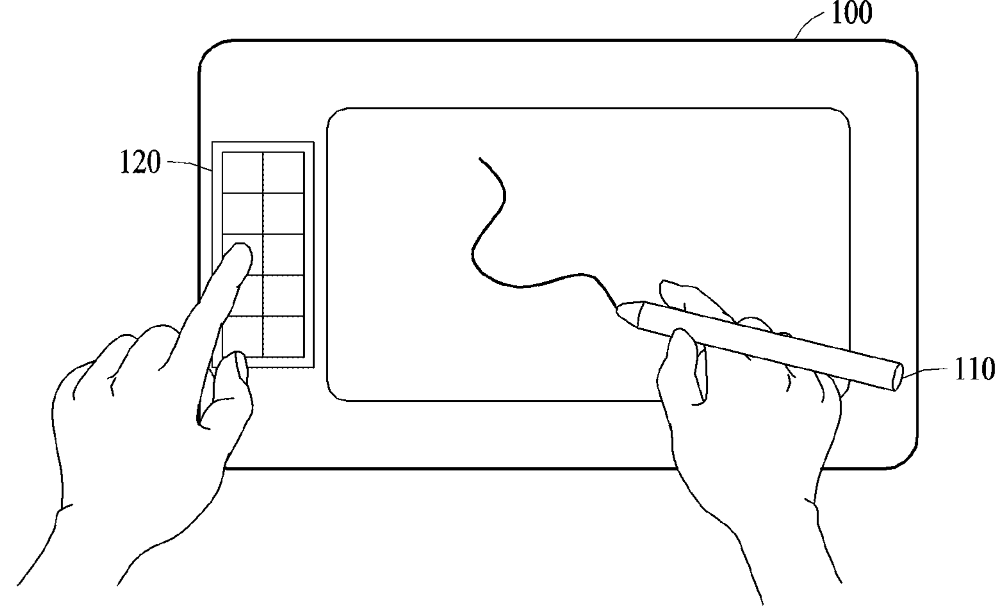
FIG. 1 is a diagram illustrating an electronic device according to an embodiment.

The following detailed structural or functional description is provided as an example only and various alterations and modifications may be made to embodiments. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an electronic device according to an embodiment.

Referring to FIG. 1, an electronic device 100 may receive various inputs, such as a touch input, a pen input, or a button input, from a user and may perform sketching based thereon. The touch input may include a tap and hold input or a tap and drag input other than a simple touch without limitation. Although the electronic device 100 is illustrated in a tablet form in FIG. 1 for ease of description, examples are not limited thereto and may include various computing devices, such as a mobile phone, a smartphone, a tablet, an e-book device, a laptop, a personal computer, a desktop, a workstation, or a server.

An input to the electronic device 100 may be based on a pen 110, a button 120, the user's hand, or the like.

The pen 110 may be a device controlled by the user's hand and may relay an input to the electronic device 100 by touching a display of the electronic device 100.

One or more functions of software executed in the electronic device 100 may be mapped to the button 120, and, when a certain button is selected by the user, a function mapped to the selected button may be executed. Although the button 120 is illustrated as a physical button in FIG. 1 for ease of description, examples are not limited thereto and may include a software-implemented button without limitation.

For example, the user may manipulate the pen 110 with a dominant hand (e.g., a right hand or a left hand) and may manipulate the button 120 with a non-dominant hand (e.g., the left hand or the right hand). Such a manipulation method may be useful in terms of muscle memory and positive haptic feedback and may also be suitable for a 'Quozai mode'. In the 'Quarzai mode', a function is only activated while a button is being pressed and the function is deactivated when a hand having pressed the button is released, and thus, an unintended error may be prevented.

For example, the functions mapped to the button 120 may include deleting an object, deleting some of the object, adding a curve to a part, adding some of the curve to the part, releasing the curve from the part, releasing some of the curve from the part, storing a key frame, tracking a trajectory, recording the tracking of the trajectory, undoing, or redoing, but examples are not limited thereto.

The electronic device 100 may include a touch display supporting a multitouch input. The multitouch input may be used to move, rotate, or enlarge a canvas or an object in two-dimensional (2D) authoring software. However, in the case of 3D sketching, when a 2D screen is touched with a finger, the 3D intention of such a touch input may be ambiguous. Such 2D-3D ambiguity may be overcome by setting the principle of touch interaction based on a kinematic chain model and designing an interaction conforming thereto.

According to the kinematic chain model, hands are divided into a dominant hand and a non-dominant hand, and the dominant hand and the non-dominant hand may share roles asymmetrically. For example, the non-dominant hand may be less sophisticated than the dominant hand but may act first in time and define a spatial reference that is a basis for an action of the dominant hand. For example, there may be the non-dominant hand holding a ruler and the dominant hand drawing a straight line with a pen or the non-dominant hand holding a bottle and the dominant hand turning a bottle cap open.

In addition, different movements may be implemented depending on a method of the dominant hand contacting an object. For example, when moving a note on a smooth desk, one finger may be used for translation and two fingers may be used for translation and rotation at the same time. In other words, each touch of the dominant hand may be considered a point-shaped positional constraint (e.g., a tip of a pointed pin).

The principles consistently applied to multitouch interactions may be as below:

Principle 1: Two or more touches may be used when moving an object;

Principle 2: A first touch may determine a spatial reference and a second touch and more may actually move an object based on the determined spatial reference; and Principle 3: The second touch and more may each be considered a point-shaped position constraint.

Even without a menu symbolized through such a multi-touch approach or a button-based graphical user interface (GUI), an unambiguous 3D input intention may be interpreted from an ambiguous input that is input to a 2D plane. Such interpretation may be based on a method of manipulating a physical object, and thus may be intuitive. In addition, unintended moving of an object may be effectively prevented by moving the object through two or more touches.

Figure 2:
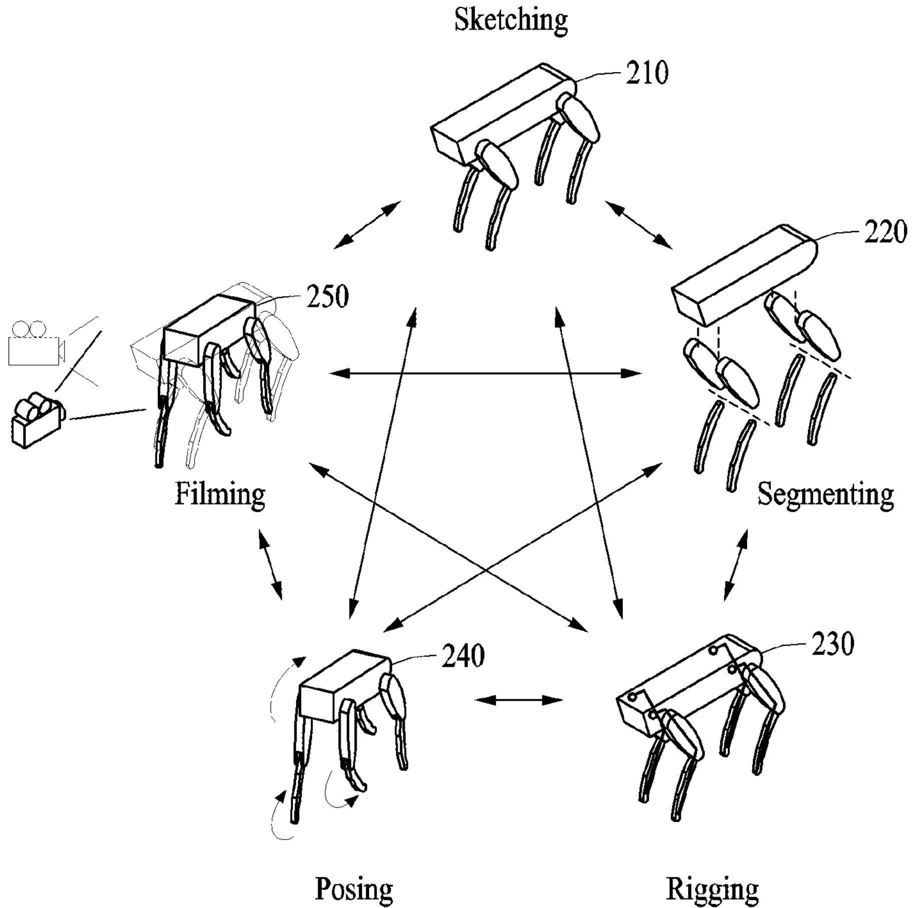
FIG. 2 is a diagram illustrating a process of designing an object, according to an embodiment.

FIG. 2 is a diagram illustrating a process of designing an object, according to an embodiment.

Referring to FIG. 2, the process of designing an object in a 3D virtual space may be divided into sketching operation 210, segmenting operation 220, rigging operation 230, posing operation 240, and filming operation 250.

In sketching operation 210, an electronic device may draw multiple sketch lines in the 3D virtual space by control of a user and may generate an object. In segmenting operation 220, the electronic device may group some of the multiple sketch lines drawn in the 3D virtual space and define them as one part and may divide the object into multiple parts. In rigging operation 230, the electronic device may generate a joint that connects one part to another part and may define a relative position or a vertical relationship between the parts. In posing operation 240, the electronic device may control the joint and change the relative position or angle between the parts and may change the object to another pose. As such, the user may verify that the shape of an object changes by moving the object sketched in the 3D virtual space and may perform sketching operation 210, segmenting operation 220, and rigging operation 230 again while the object is changed to the other pose. In addition, in filming operation 250, the electronic device may record a process of the object changing from one pose to another pose.

The electronic device may modify a sketch after moving an object. The electronic device may erase an existing sketch line and generate a new sketch line in the object that has moved. If the newly generated sketch line is included in a pre-generated part, the newly generated sketch line may move together with the part. According to embodiments, when a movement is not desired by the user, by modifying a joint making the movement, the movement may be changed to another movement. Various poses of the object through various movements may be stored, and sketch modifications in one pose may be reflected in the rest of the poses.

Users may use various types of a joint and reproduce a movement of an object made by a corresponding joint. In addition, a movement that may not be performed by one joint may be enabled by using multiple joints, and a movement of a product of which the shape changes depending on the movements of other parts by connecting another moving part to a moving part. By doing so, the users may express all the movements of the object and may observe the shape of the object changing according to the movements.

The present invention may display a state of a sketch line through the color, thickness, or type (e.g., a solid line or a dotted line) of the sketch line on a screen without separating a space for a user to verify the state of the sketch line expressing an object in a 3D virtual space. By doing so, the user may readily verify the state without looking away from a target which they are currently working on in a working process.

For example, the color may be divided into black, gray, or chromatic colors herein. A sketch line expressed in black may be an object usable in a current state. Selecting the black sketch line may cause an operation of a function or a change in a system. A sketch line expressed in gray may be an object to which a function is not applied when the function operates. A sketch line expressed in chromatic colors may be an object to which a function is applied when the function operates. The colors stated herein are just examples, and sketch lines may be distinguished through other various methods.

Sketching operation 210, segmenting operation 220, rigging operation 230, posing operation 240, and filming operation 250 that are performed in the process of designing an object may be organically combined with one another, and thus, an operation to be performed after one operation has been performed is not limited, and various operations may be performed continuously without limitation. Even if concepts are modified frequently and repeatedly in an initial product design stage, all operations may be performed multiple times regardless of orders.

Figure 3:
FIG. 3 is a diagram illustrating a reference plane according to an embodiment.
Figure 3:
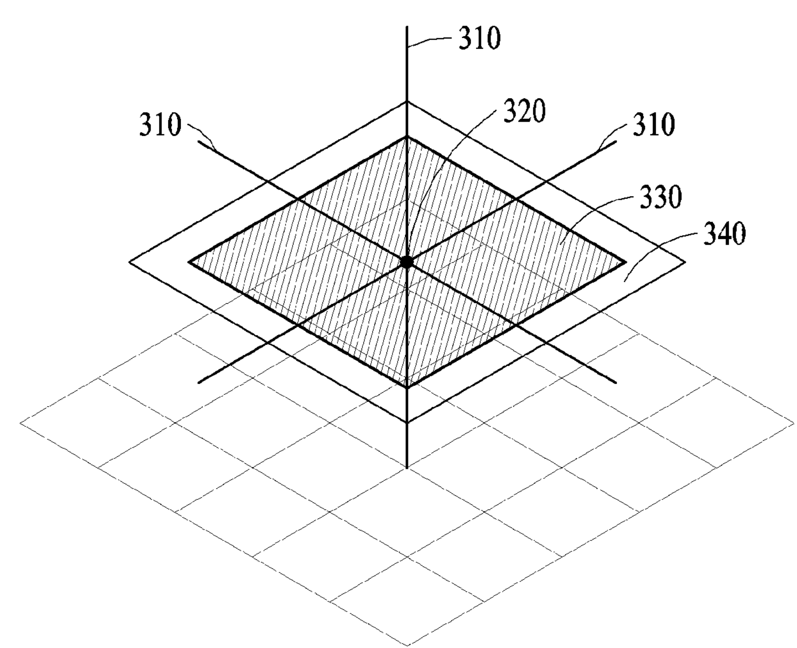

FIG. 3 is a diagram illustrating a reference plane according to an embodiment.

Referring to FIG. 3, a reference plane 300 may be a plane that is placed in a 3D virtual space and on which a sketch line is drawn according to an input by a user and may be used for the sketch line to be drawn in the 3D virtual space according to the intention of the user.

The reference plane 300 may be preset before a sketching operation is performed. For example, the reference plane 300 may be generated based on one or more points specified by tapping a pen tip on a grid line set in the 3D virtual space or a previously drawn sketch line. When there is one specified point, the reference plane 300 having a tangential direction of a sketch line including the point as a normal direction may be generated. When there are two specified points, the reference plane 300 having an average of tangential directions of sketch lines including the two points as a normal direction may be generated. When there are three specified points, the reference plane 300 including all three points may be generated. However, an example of the generation of the reference plane 300 is not limited to the foregoing examples.

The reference plane 330 may include a plurality of axes 310, a center point 320, a middle region 330, and a surrounding region 340. The plurality of axes 310 may have x-axis, y-axis, and z-axis directions centered on the center point 320 of the reference plane 300. The middle region 330 may be a region of a predetermined shape (e.g., a square) centered on the center point 320 and may also be referred to as a face. The surrounding region 340 may be an area surrounding the middle region 330 and may also be referred to as a bezel. These elements of the reference plane 300 may help users to interpret a 3D position and direction of the reference plane 300 and may be used to control the position and direction of the reference plane 300 at 6 degrees of freedom through double-handed multitouch interaction. The operation of controlling the position and direction of the reference plane 300 is described below with reference to FIGS. 4 to 12. In addition, the reference plane 300 may be used to generate a joint that connects parts through a rigging operation, which is described below with reference to FIGS. 16 to 21.

According to embodiments, a shadow (not shown) projected onto a floor by the reference plane 300 in a perpendicular direction of a 3D space may be displayed, and, when the reference plane 300 is below the floor, the shadow may be dark, and, when a sketch line in the 3D space passes through the reference plane 300, an intersection point of the sketch line and the reference plane 300 may be displayed. Such visualization may help the users to interpret the position and direction of the reference plane 300 in the 3D space when the reference plane 300 is stationary or moving.

FIGS. 4 to 12 are diagrams each illustrating a control operation for a reference plane, according to an embodiment.

Figure 4:
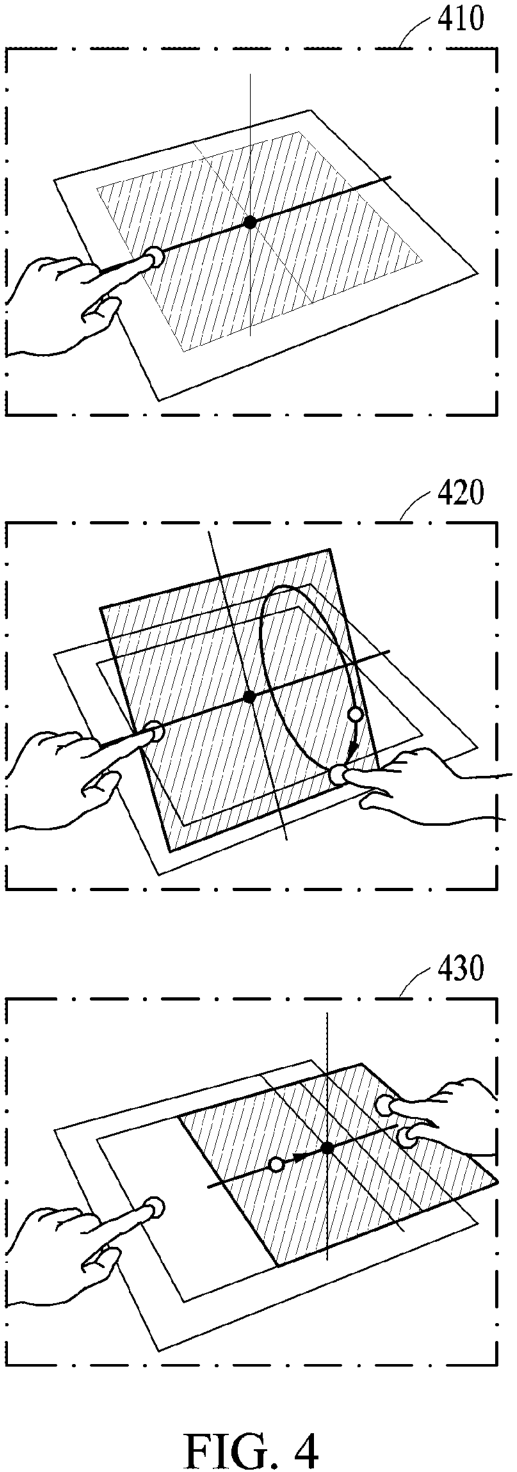
FIGS. 4 to 12 are diagrams each illustrating a control operation for a reference plane, according to an embodiment.

FIG. 4 illustrates an example of a control of rotating or moving the reference plane in a 3D virtual space. In operation 410, when a user touches an axis of the reference plane with a non-dominant hand, a linear axis constraint to the reference plane may be applied. For example, a selected axis may be displayed visually differently from other elements on the reference plane and may allow the user to verify whether an intended touch input is accurately input.

In operation 420, when one tap and drag input is input by a dominant hand to a middle region of the reference plane while the user is maintaining the touch input by the non-dominant hand to the axis of the reference plane, the reference plane may rotate around the axis to which the touch input is input according to the tap and drag input.

In operation 430, when two tap and drag inputs are input by the dominant hand to the middle region of the reference plane while the user is maintaining the touch input by the non-dominant hand to the axis of the reference plane, the reference plane may move along the axis to which the touch input is input.

Hereinafter, an example of the principle of implementing a 3D control over the reference plane in the 3D virtual space through a 2D touch control that is input to a 2D display of an electronic device is provided.

Figure 5:
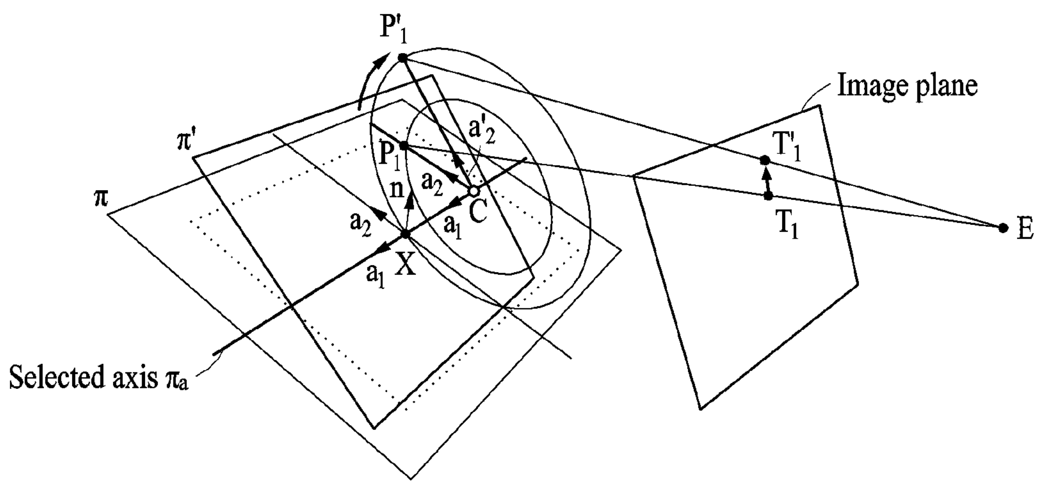

FIG. 5 illustrates an example of implementing the rotation of the reference plane in operation 420. In FIG. 5, a reference plane π may be defined by a position X, a normal n, and two axis directions $a_1$ and $a_2$. The movement of the reference plane π may be expressed as shown below.

$$\pi:\{X, n, a_1, a_2\} \rightarrow \pi':\{X', n', a_1', a_2'\} \quad \text{Equation 1}$$

While an axis $\pi_a$ of the direction $a_1$ is selected, a touch $T_1$ may be input to an image plane. The image plane may be a plane corresponding to a display of the electronic device, and a touch that is input to the display may be expressed on the image plane. In FIG. 5, E may be a point corresponding to an eye of the user.

The touch $T_1$ may include X and may be projected as $P_1$ by an intersection point of a plane p(X, n) having the normal n and a line l(E, $T_1$) connecting E to $T_1$, which may be expressed as shown below.

$$P_1 = l(E, T_1) \cap p(X, n) \quad \text{Equation 2}$$

A second plane p(C, $a_1$) may be defined, and a position C included in the plane may be calculated as shown below.

$$C = X + ((P_1 - X)\cdot a_1)a_1 \quad \text{Equation 3}$$

When a touch that is input as $T_1$ is dragged to $T_1'$, $T_1'$ may be projected as $P_1'$ onto the second plane p(C, $a_1$) as shown below.

$$P_1' = l(E, T_1') \cap p(C, a_1) \quad \text{Equation 4}$$

Finally, the reference plane π may rotate to π' as shown below.

$$X' = X \quad \text{Equation 5}$$

$$a_1' = a_1$$

-continued $$a_2' = \frac{P_1' - C}{\|P_1' - C\|}$$

$$n' = a_1' \times a_2'$$

Figure 6:
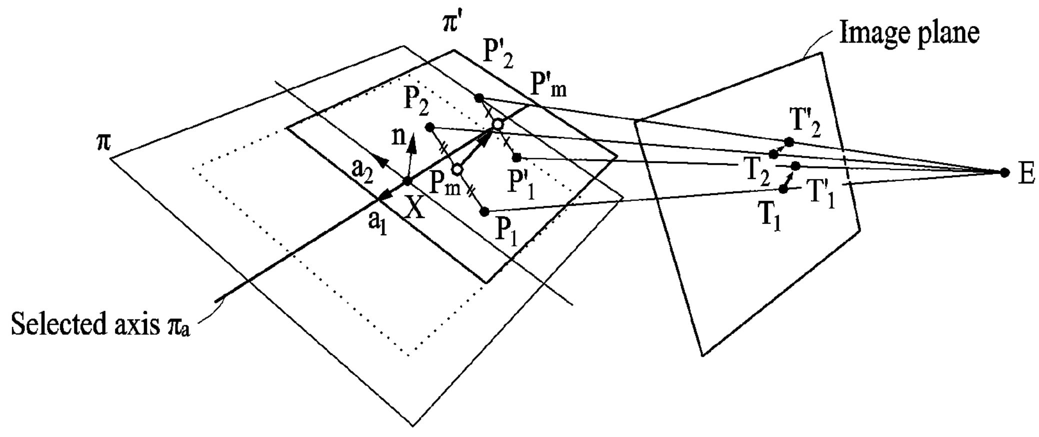

FIG. 6 illustrates an example of implementing the movement of the reference plane in operation 430. In FIG. 6, the reference plane π may be defined by the position X, the normal n, and the two axis directions $a_1$ and $a_2$. The movement of the reference plane π may be expressed as shown below.

$$\pi:\{X, n, a_1, a_2\} \rightarrow \pi':\{X', n', a_1', a_2'\} \quad \text{Equation 6}$$

While the axis $\pi_a$ of the direction $a_1$ is selected, two touches $T_1$ and $T_2$ may be input to the image plane. The touch $T_1$ may be projected as $P_1$ by the intersection point of the plane p(X, n) and the line l(E, $T_1$), and the touch $T_2$ may be projected as $P_2$ by an intersection point of the plane p(X, n) and a line l(E, $T_2$).

$$P_1 = l(E, T_1) \cap p(X, n) \quad \text{Equation 7}$$

$$P_2 = l(E, T_2) \cap p(X, n)$$

A midpoint of the positions $P_1$ and $P_2$ may be calculated as $P_m$ as shown below.

$$P_m = \frac{P_1 + P_2}{2} \quad \text{Equation 8}$$

When the input touches are dragged respectively to $T_1$' and $T_2$', each of $P_1$', $P_2$', and $P_m$' may be calculated as shown below.

$$P_1' = l(E, T_1') \cap p(X, n) \quad \text{Equation 9}$$

$$P_2' = l(E, T_2') \cap p(X, n)$$

$$P_m' = \frac{P_1' + P_2'}{2}$$

Finally, the reference plane π may move to π' as shown below.

$$X' = X + ((P_m' - P_m) \cdot a_1)a_1 \quad \text{Equation 10}$$

$$a_1' = a_1$$

$$a_2' = a_2$$

$$n' = n$$

Figure 7:
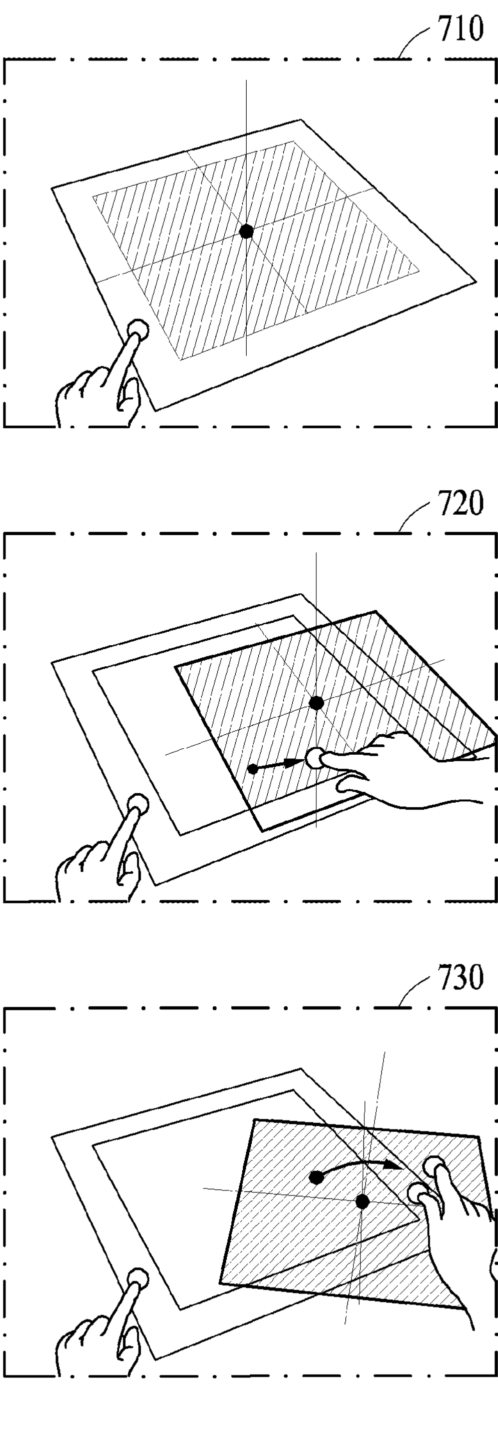

FIG. 7 illustrates an example of a control of rotating or moving the reference plane in a 3D virtual space. In operation 710, when the user touches a surrounding region of the reference plane with the non-dominant hand, a constraint to the reference plane may be applied. For example, a selected surrounding region may be displayed visually differently from other elements on the reference plane and may allow the user to recognize whether an intended touch input is accurately input.

In operation 720, when one tap and drag input is input by a dominant hand to a middle region of the reference plane while the user is maintaining the touch input by the non-dominant hand to the surrounding region of the reference plane, the reference plane may move on the reference plane according to the tap and drag input.

In operation 730, when two tap and drag inputs are input by the dominant hand to the middle region of the reference plane while the user is maintaining the touch input by the non-dominant hand to the surrounding region of the reference plane, the reference plane may move and/or rotate on the reference plane according to the tap and drag input.

Figure 8:
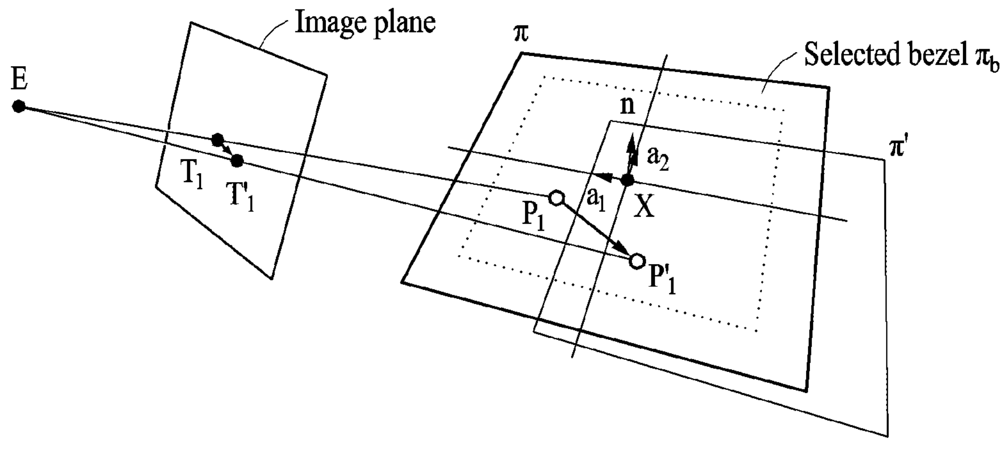

FIG. 8 illustrates an example of implementing the movement of the reference plane in operation 720. In FIG. 8, the reference plane π may be defined by the position X, the normal n, and the two axis directions $a_1$ and $a_2$. The movement of the reference plane π may be expressed as shown below.

$$\pi:\{X, n, a_1, a_2\} \rightarrow \pi':\{X', n', a_1', a_2'\} \quad \text{Equation 11}$$

While a surrounding region $\pi_b$ is selected, the touch $T_1$ may be input to the image plane. The touch $T_1$ may be projected as $P_1$ by the intersection point of the plane p(X, n) and the line l(E, $T_1$).

$$P_1 = l(E, T_1) \cap p(X, n) \quad \text{Equation 12}$$

When the input touch $T_1$ is dragged to $T_1$', $P_1$' may be calculated as shown below.

$$P_1' = l(E, T_1') \cap p(X, n) \quad \text{Equation 13}$$

Finally, the reference plane π may move to π' as shown below.

$$X' = X + ((P_1' - P_1) \quad \text{Equation 14}$$

$$a_1' = a_1$$

$$a_2' = a_2$$

$$n' = n$$

Figure 9:
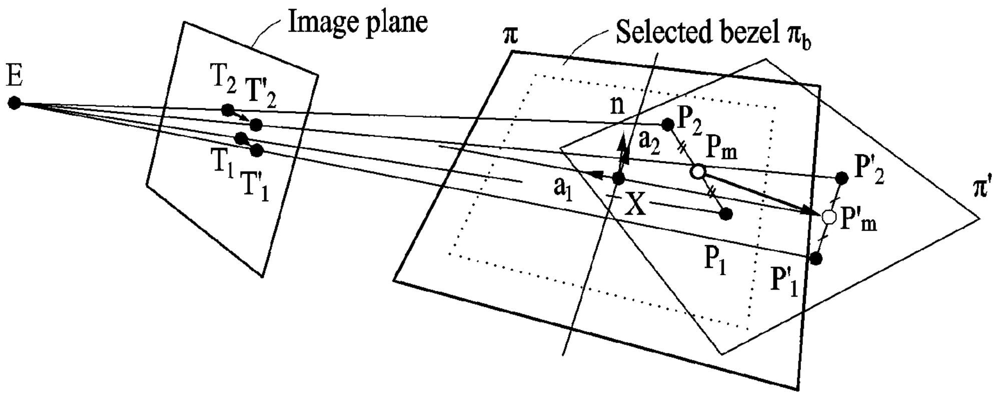

FIG. 9 illustrates an example of implementing the movement and/or rotation of the reference plane in operation 730. In FIG. 9, the reference plane π may be defined by the position X, the normal n, and the two axis directions $a_1$ and $a_2$. The movement of the reference plane π may be expressed as shown below.

$$\pi:\{X, n, a_1, a_2\} \rightarrow \pi':\{X', n', a_1', a_2'\} \quad \text{Equation 15}$$

While the surrounding region $\pi_b$ is selected, two touches $T_1$ and $T_2$ may be input to the image plane. The touch $T_1$ may be projected as $P_1$ by the intersection point of the plane p(X, n) and the line l(E, $T_1$), and the touch $T_2$ may be projected as $P_2$ by an intersection point of the plane p(X, n) and a line l(E, $T_2$).

$$P_1 = 1(E, T_1) \cap p(X, n) \quad \text{Equation 16}$$

$$P_2 = 1(E, T_2) \cap p(X, n)$$

A midpoint of the positions $P_1$ and $P_2$ may be calculated as $P_m$ as shown below.

$$P_m = \frac{P_1 + P_2}{2} \quad \text{Equation 17}$$

When the input touches are dragged respectively to $T_1$' and $T_2$', each of $P_1$', $P_2$', and $P_m$' may be calculated as shown below.

$$P_1' = l(E, T_1') \cap p(X, n) \quad \text{Equation 18}$$

$$P_2' = l(E, T_2') \cap p(X, n)$$

$$P_m' = \frac{P_1' + P_2'}{2}$$

A quaternion q, which represents the rotation of unit vectors
from $$\frac{P_2 - P_1}{\|P_2 - P_1\|} \text{ to } \frac{P_2' - P_1'}{\|P_2' - P_1'\|},$$

may be calculated.

Finally, the reference plane $\pi$ may move and/or rotate to $\pi$' as shown below.

$$X' = X + (P_m' - P_m) \quad \text{Equation 19}$$

$$a_1' = q a_1 q^{-1}$$

$$a_2' = q a_2 q^{-1}$$

$$n' = n$$

Figure 10:
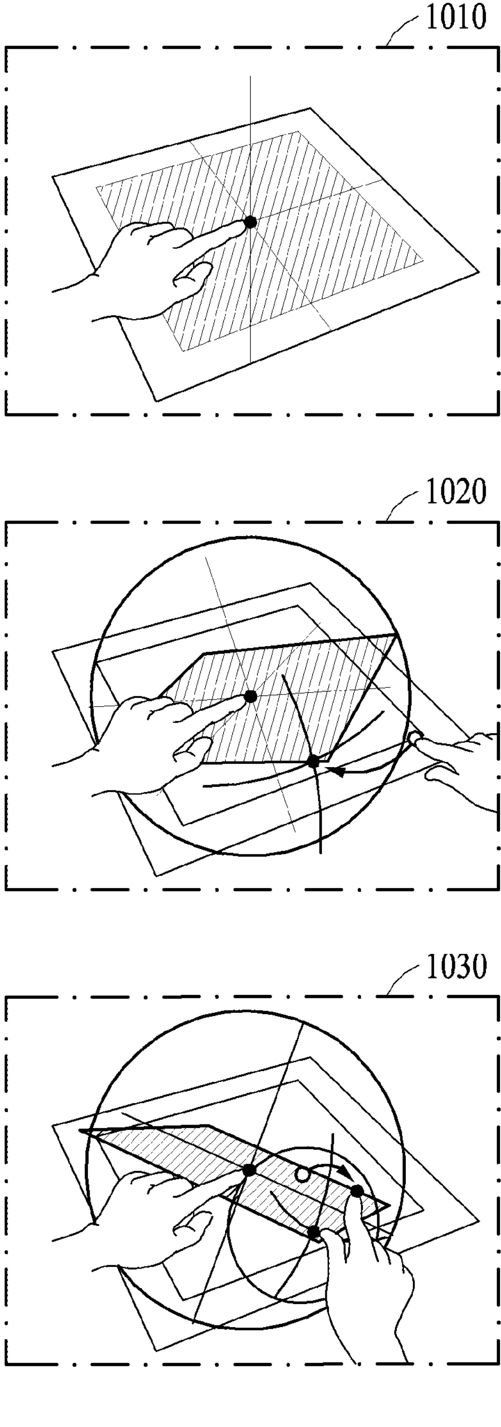

FIG. 10 illustrates an example of a control of orbiting or spinning the reference plane in the 3D virtual space. In operation 1010, when the user touches a center point of the reference plane with the non-dominant hand, a spherical constraint to the reference plane may be applied. For example, a selected center point may be displayed visually differently from other elements on the reference plane and may allow the user to recognize whether an intended touch input is accurately input.

In operation 1020, when one tap and drag input is input by the dominant hand to the middle region of the reference plane while the user is maintaining the touch input by the non-dominant hand to the center point of the reference plane, the reference plane may orbit around the center point according to the tap and drag input.

In operation 1030, when two tap and drag inputs are input by the dominant hand to the middle region of the reference plane while the user is maintaining the touch input by the non-dominant hand to the center point of the reference plane, the reference plane may orbit and/or spin around the center point according to the tap and drag input.

Figure 11:
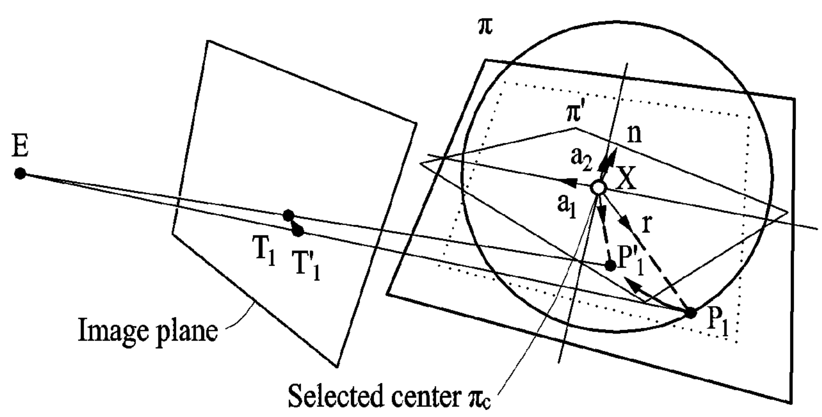

FIG. 11 illustrates an example of implementing the orbiting of the reference plane in operation 1020. In FIG. 11, the reference plane $\pi$ may be defined by the position X, the normal n, and the two axis directions $a_1$ and $a_2$. The movement of the reference plane $\pi$ may be expressed as shown below.

$$\pi: \{X, n, a_1, a_2\} \rightarrow \pi': \{X', n', a_1', a_2'\} \quad \text{Equation 20}$$

While a center point $\pi_c$ is selected, the touch $T_1$ may be input to the image plane. The touch $T_1$ may be projected as $P_1$ by the intersection point of the plane p(X, n) and the line l(E, $T_1$).

$$P_1 = l(E, T_1) \cap p(X, n) \quad \text{Equation 21}$$

In addition, a sphere s(X, r) that is positioned in X and has a radius $\pi$ may be defined. Here, $\pi$ may be calculated as shown below.

$$r = \|P_1 - X\| \quad \text{Equation 22}$$

When the input touch $T_1$ is dragged to $T_1$', $P_1$' where $T_1$' is projected onto the sphere s(X, r) may be calculated as shown below.

$$P_1' = l(E, T_1') \cap s(X, r) \quad \text{Equation 23}$$

When a line l(E, $T_1$') intersects the sphere s(X, r), a quaternion $q_o$ representing the rotation of unit vectors from $$\frac{P_1 - X}{\|P_1 - X\|} \text{ to } \frac{P_1' - X}{\|P_1' - X\|}$$

may be calculated.

Finally, the reference plane $\pi$ may orbit to $\pi$' as shown below.

$$X' = X \quad \text{Equation 24}$$

$$a_1' = q_o a_1 q_o^{-1}$$

$$a_2' = q_o a_2 q_o^{-1}$$

$$n' = a_1' \times a_2'$$

Figure 12:
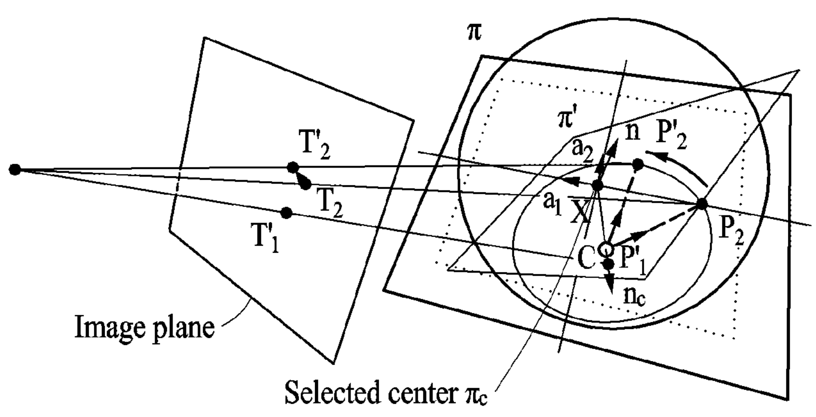

FIG. 12 illustrates an example of implementing the orbiting and/or spinning of the reference plane in operation 1030. Additional spinning with respect to the reference plane $\pi$' orbiting around the center point $\pi_c$ described with reference to FIG. 11 may be expressed as shown below.

$$\pi': \{X', n', a_1', a_2'\} \rightarrow \pi'': \{X'', n'', a_1'', a_2''\} \quad \text{Equation 25}$$

When the second touch $T_2$ is input, the touch $T_2$ may be projected as $P_2$ onto the sphere s(X, r).

$$P_2 = l(E, T_2) \cap s(X, r) \quad \text{Equation 26}$$

When the line l(E, $T_1$') intersects the sphere s(X, r), a second plane p(C, $n_c$) may be defined as shown below.

$$n_c = \frac{P_1' - X}{\|P_1' - X\|} \quad \text{Equation 27}$$

$$C = X + ((P_2 - X) \cdot n_c) n_c$$

When the second touch $T_2$ is dragged to $T_2$', $P_2$' where $T_2$' is projected onto the second plane p(C, $n_c$) may be calculated as shown below.

$$P_2' = l(E, T_2') \cap p(C, n_c) \quad \text{Equation 28}$$

A quaternion q which represents the rotation of unit vectors from $$\frac{P_2 - C}{\|P_2 - C\|} \text{ to } \frac{P_2' - C}{\|P_2' - C\|},$$

may be calculated.

Finally, the reference plane π' may spin to π" as shown below.

$$X'' = X' \quad \text{Equation 29}$$

$$a_1'' = q_s a_1' q_s^{-1}$$

$$a_2'' = q_s a_2' q_s^{-1}$$

$$n'' = a_1'' \times a_2''$$

Figure 13:
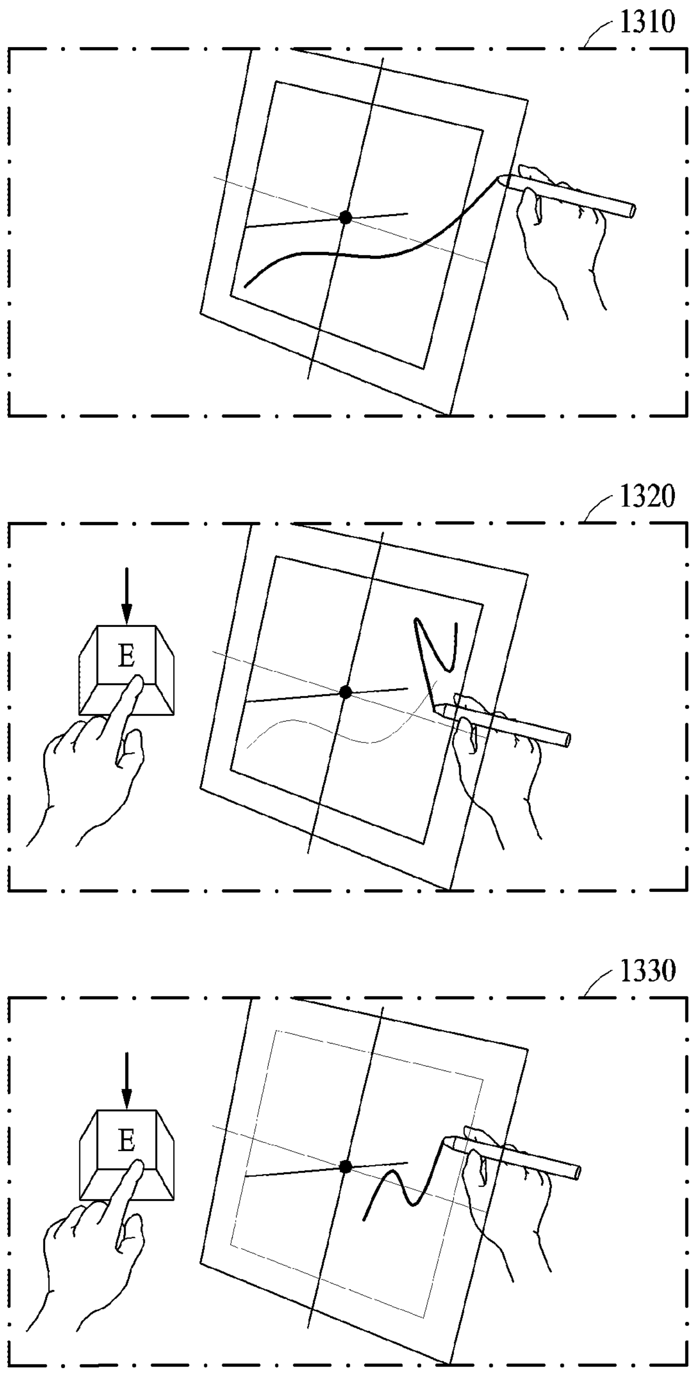
FIG. 13 is a diagram illustrating a sketching operation according to an embodiment.

FIG. 13 is a diagram illustrating a sketching operation according to an embodiment.

FIG. 13 illustrates an example of a control of performing sketching by using a reference plane in a 3D virtual space. In operation 1310, when drawing a 2D line (e.g., a straight line or a curved line) on a display of an electronic device after placing the reference plane in a position and a direction, as desired by a user, the 2D line may be projected onto the reference plane that is in the 3D virtual space, and a 3D line may be determined. Although an example of performing sketching with a pen input by a dominant hand is illustrated in FIG. 13 for ease of description, a sketch input is not limited thereto. In operation 1320, when the user crosses a line sketched through a pen input performed by the dominant hand while pressing a delete button with a non-dominant hand, the sketched line may be deleted. In operation 1330, when the user crosses the reference plane through a pen input performed by the dominant hand while pressing the delete button with the non-dominant hand, the reference plane may be deleted.

A 3D object may be expressed in the 3D virtual space by a plurality of lines drawn through the sketching operation described above.

Figure 14:
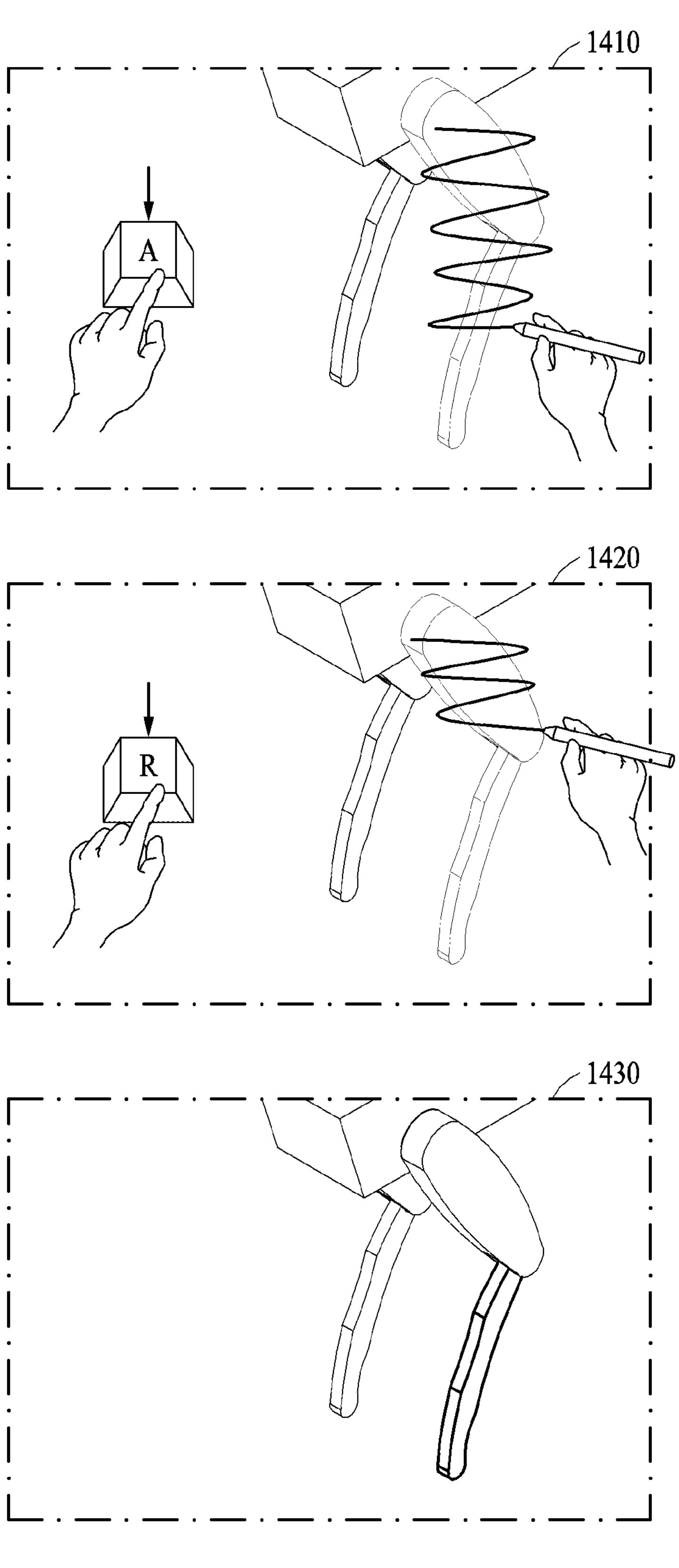
FIG. 14 is a diagram illustrating a segmenting operation according to an embodiment.

FIG. 14 is a diagram illustrating a segmenting operation according to an embodiment.

FIG. 14 illustrates an example of a control of determining some of lines representing an object to be one part. In operation 1410, when a user selects (e.g., crosses a line through a pen input by a dominant hand) some of a plurality of lines expressing an object in a 3D virtual space while pressing a button indicating 'adding a line to a part' with a non-dominant hand, the selected lines may be set as the same part. For example, the selected lines may be visually distinguished from unselected lines of the plurality of lines and may allow the user to verify whether an intended input is accurately input. In addition, according to an embodiment, when the user selects some of lines while pressing a button indicating 'adding some of lines to a part' with the non-dominant hand, the selected some of lines may only be set as the part. In operation 1420, when the user selects (e.g., crosses a line through a pen input by the dominant hand) some of lines included in a part while pressing a button indicating 'releasing a line from a part' with the non-dominant hand, the selected lines may be released from the part. In addition, according to an embodiment, when the user selects some of lines while pressing a button indicating 'releasing some of lines from a part' with the non-dominant hand, the selected some of lines may only be released from the part. In operation 1430, an example of a completed segmenting operation is illustrated.

The shape of a line does not change through a segmenting operation. Through the segmenting operation, the user may set some of a plurality of lines as one part.

For example, when drawing a new sketch line while modifying one certain part, the line may automatically belong to the certain part that is being modified. However, while modifying the certain part, other lines that are not set as the part may not be modified. Through this exclusive feature, the user may only focus on a certain part and perform a task. For example, the user may focus on a robot's leg without worrying about an unintended change in the robot's body.

Figure 15:
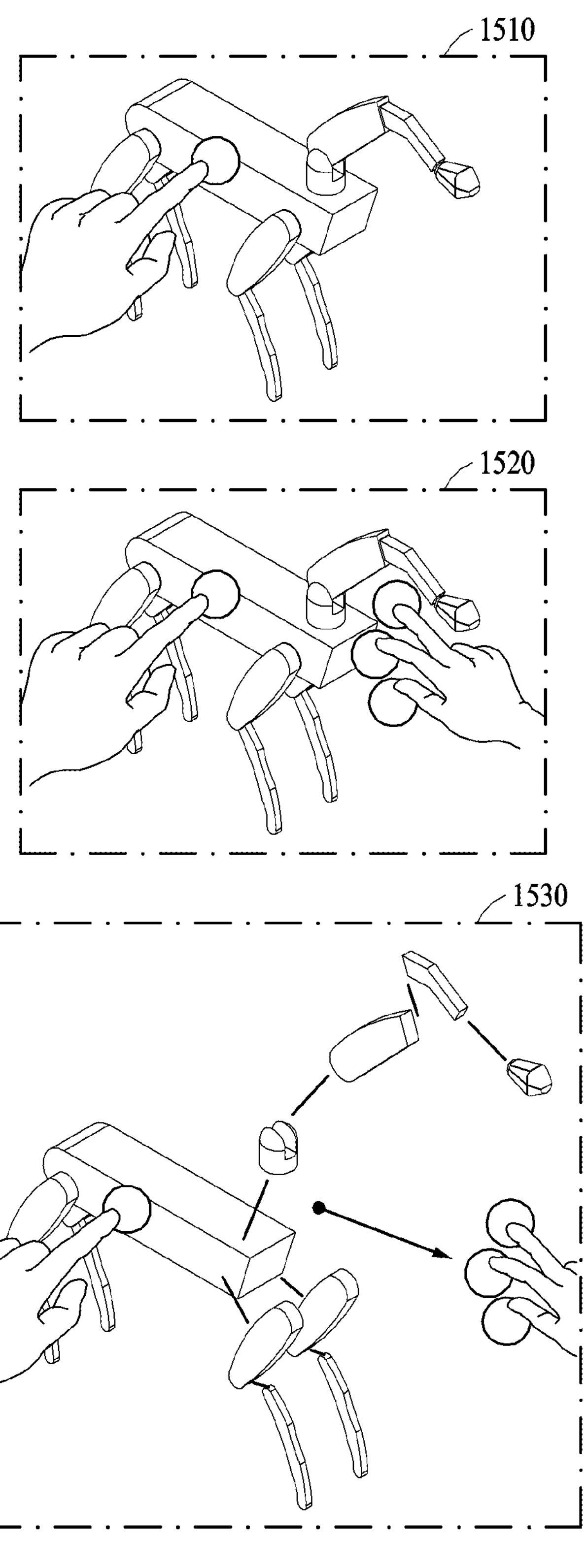
FIG. 15 is a diagram illustrating an exploded view operation according to an embodiment.

FIG. 15 is a diagram illustrating an exploded view operation according to an embodiment.

FIG. 15 illustrates an example of an exploded view control over a plurality of parts of an object. In operation 1510, a user may touch a part to be fixed among the plurality of parts with a non-dominant hand. In operation 1520, the user may touch a plurality (e.g., three or more) of empty spaces with a dominant hand while maintaining a touch input by the non-dominant hand. In operation 1530, the user may drag a plurality of touch inputs by the dominant hand, and then, an exploded view where the other parts may be away from one another with the fixed part as a center may be activated.

While the exploded view is activated, the user may select a part which the user desires to modify, may delete a parent part-child part relationship to be described below, may delete a joint set between parts, or may perform other various controls.

FIGS. 16 to 21 are diagrams each illustrating a rigging operation according to an embodiment.

A user may control an object as if demonstrating a desired movement and pose in a 3D virtual space, and an electronic device may determine the type, position, direction, or movement range (e.g., a range of motion) of a joint reversely from such control. A joint may be generated by selecting (i.e., inputting touch inputs by the user to a reference plane and a part at the same time while the reference part penetrates at least some of the part) an already segmented part overlapping the reference plane and moving it together with the reference plane. The movement of generating a joint may have to be repetitive, and this may be to distinguish it from simply moving and/or rotating a corresponding part. Hereinafter, a process of generating a hinge joint, a linear slider, a curved slider, and a ball joint is described with reference to the drawings.

Figure 16:
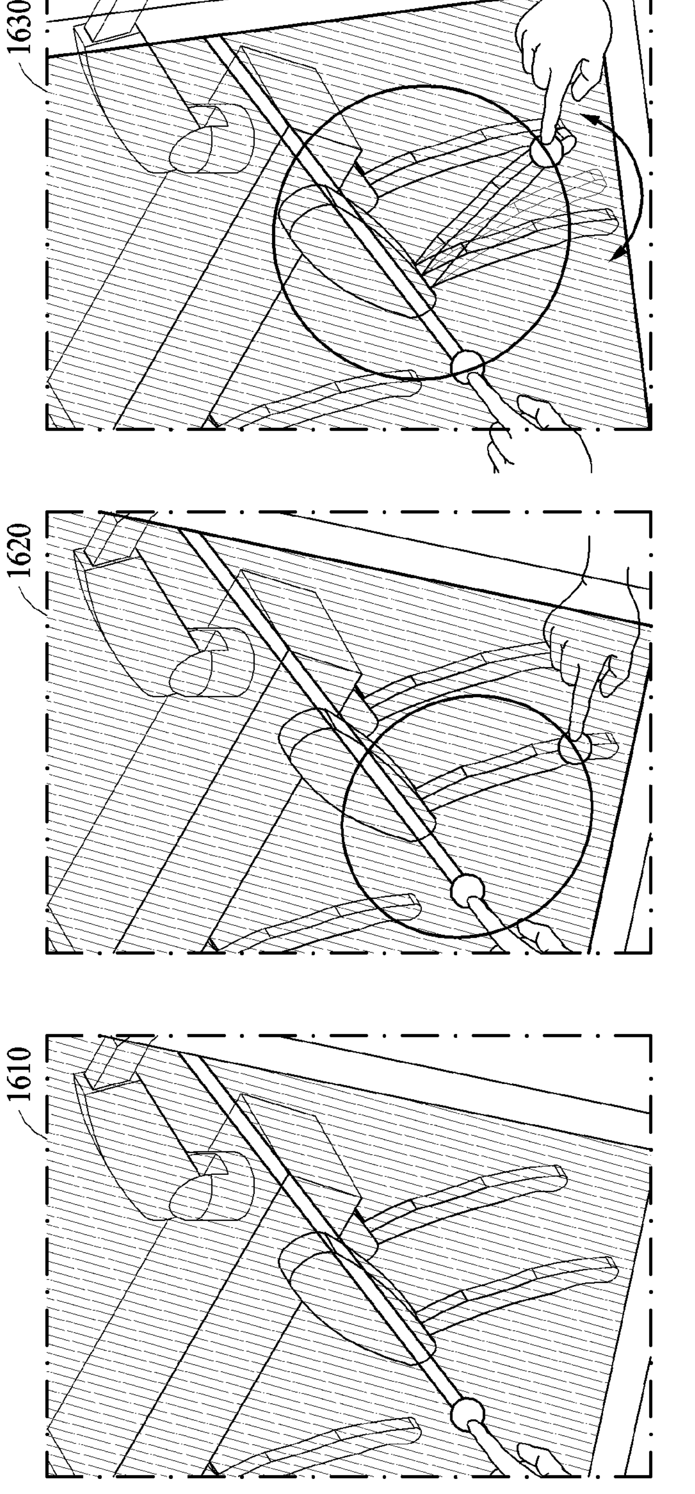
FIGS. 16 to 21 are diagrams each illustrating a rigging operation according to an embodiment.

FIG. 16 illustrates an example of a control of generating a hinge joint. In operation 1610, the user may touch an axis set for the reference plane with a non-dominant hand. For example, the axis of the reference plane to which a touch input by the user is input may penetrate a part where a joint is to be generated. In operation 1620, when one tap and drag input is input by a dominant hand to a part overlapping the reference plane while the user is maintaining the touch input by the non-dominant hand to the axis of the reference plane, the part may rotate around the axis of the reference plane. In operation 1630, when the user repeatedly rotates a part around the axis of the reference plane through a tap and drag input by the dominant hand, a movement afterimage of the part may form a trajectory, through which a hinge joint where the part rotates around the axis of the reference plane may be generated.

For example, the hinge joint may be generated in a position where the axis of the reference plane passes through the part, and then may rotate the part based on a part adjacent to the part. In addition, the hinge joint may have a movement range according to a repetitive movement for joint generation. In other words, when a rotation by the repetitive movement occurs within a certain angle, the movement range of the hinge joint may be limited to the angle, but examples are not limited thereto.

Figure 17:
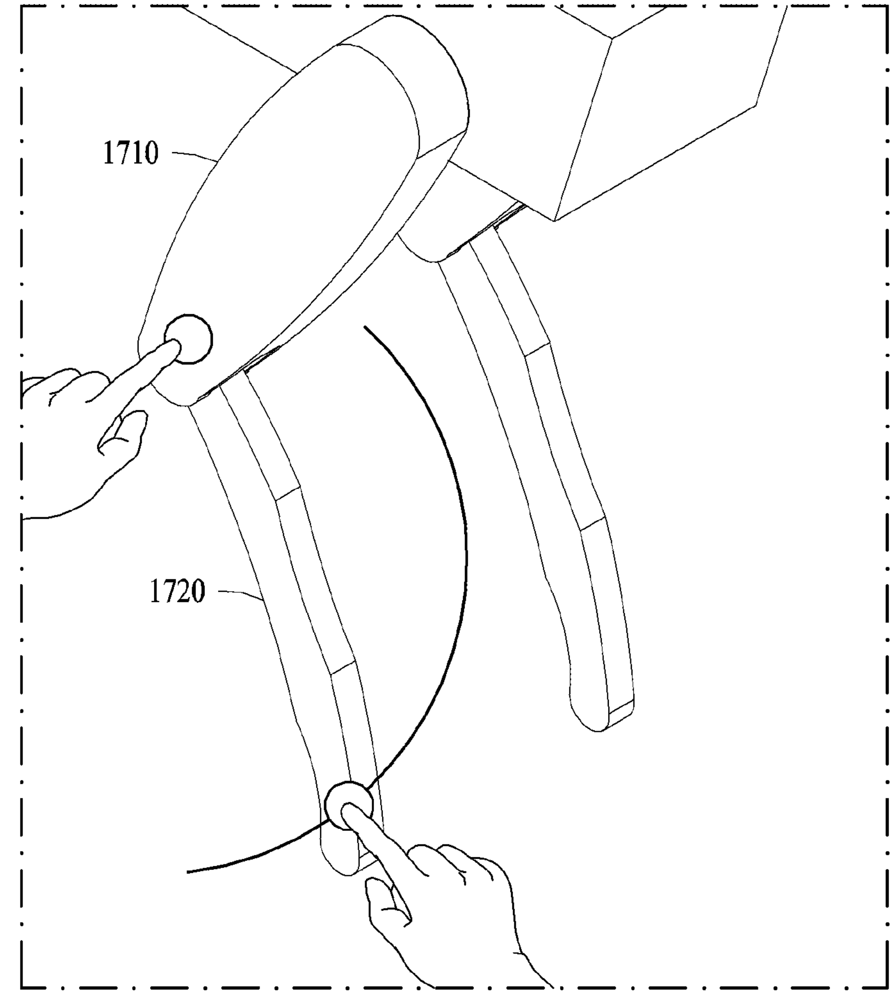

FIG. 17 illustrates an example of a control of setting a relationship between a parent part and a child part. After a joint is generated, the parent part-child part relationship may be set. A part which the user touches and fixes with the non-dominant hand may be the parent part, and a part which the user touches and moves with the dominant hand may be the child part. The parent part-child part relationship may be visually displayed in the exploded view described with reference to FIG. 15, and the parent part-child part relationship may be deleted by control of the user, or the movement range of the joint may be modified.

Figure 18:
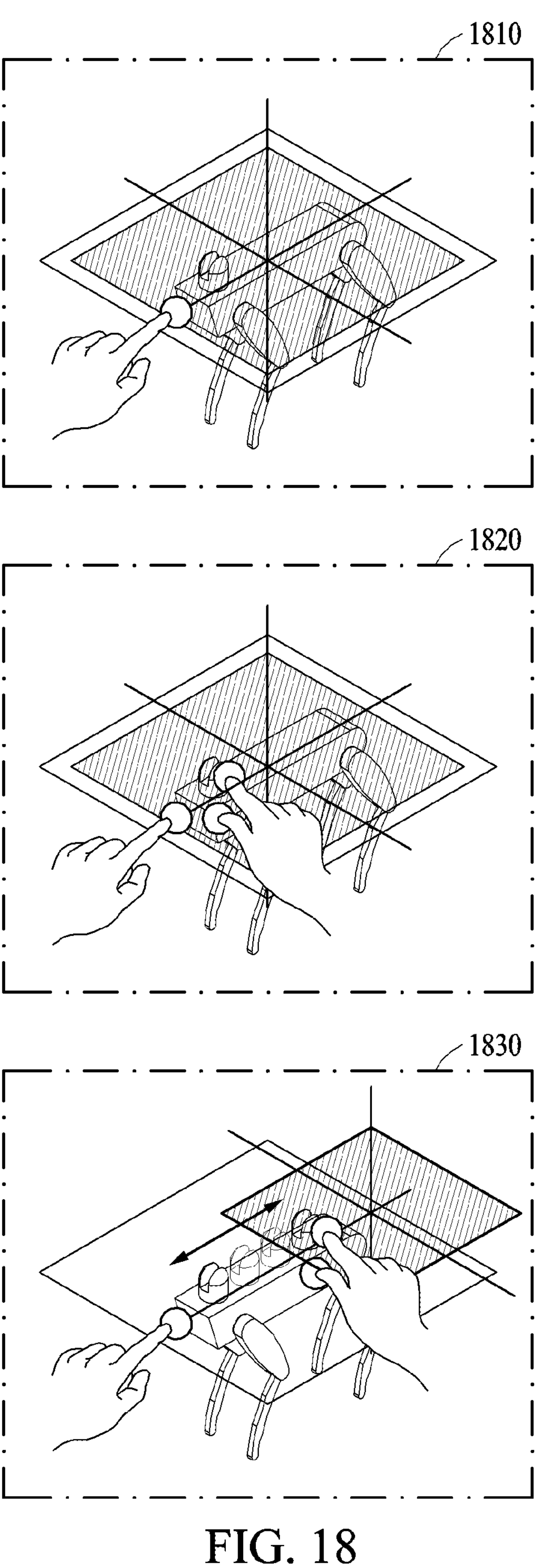

FIG. 18 illustrates an example of a first control of generating a linear slider. In operation 1810, the user may touch an axis set for the reference plane with the non-dominant hand. For example, the axis of the reference plane to which a touch input by the user is input may penetrate or contact a part where a joint is to be generated. In operation 1820, when two tap and drag inputs are input by the dominant hand to a part overlapping the reference plane while the user is maintaining the touch input by the non-dominant hand to the axis of the reference plane, the part may linearly move along the axis of the reference plane. In operation 1830, when the user repeatedly linearly moves a part along the axis of the reference plane through a tap and drag input by the dominant hand, a movement afterimage of the part may form a trajectory, through which a linear slider where the part linearly moves along the axis of the reference plane may be generated.

Figure 19:
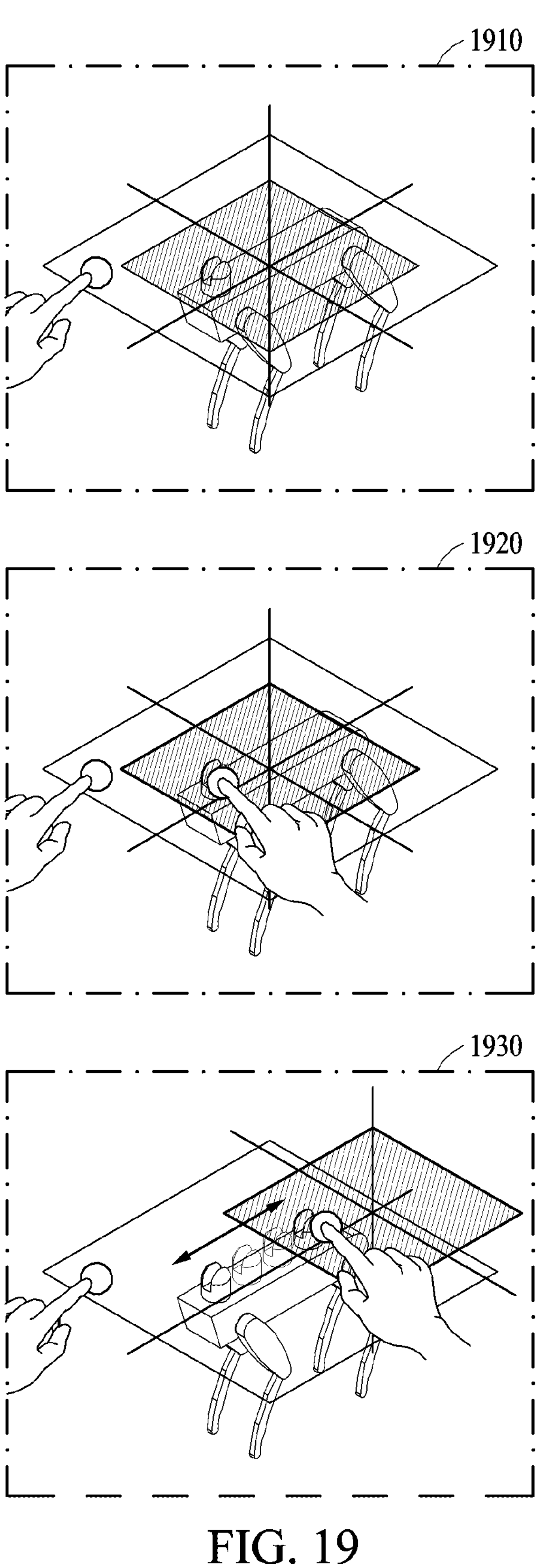

FIG. 19 illustrates an example of a second control of generating a linear slider. In operation 1910, the user may touch a surrounding region set for the reference plane with the non-dominant hand. For example, the reference plane having the surrounding region to which a touch input by the user is input may penetrate or contact a part where a joint is to be generated. In operation 1920, when one tap and drag input is input by the dominant hand to a part overlapping the reference plane while the user is maintaining the touch input by the non-dominant hand to the surrounding region of the reference plane, the part may linearly move on the reference plane. In operation 1930, when the user repeatedly linearly moves a part on the reference plane through a tap and drag input by the dominant hand, a movement afterimage of the part may form a trajectory, through which a linear slider where the part linearly moves on the reference plane may be generated.

For example, the linear slider described above may be generated in a position where the reference plane or the axis of the reference plane passes through or contacts the part, and then may linearly move the part based on a part adjacent to the part. In addition, the linear slider may have a movement range according to a repetitive movement for joint generation. In other words, when a linear movement by the repetitive movement occurs within a certain range, the movement range of the linear slider may be limited to the range, but examples are not limited thereto.

Figure 20:
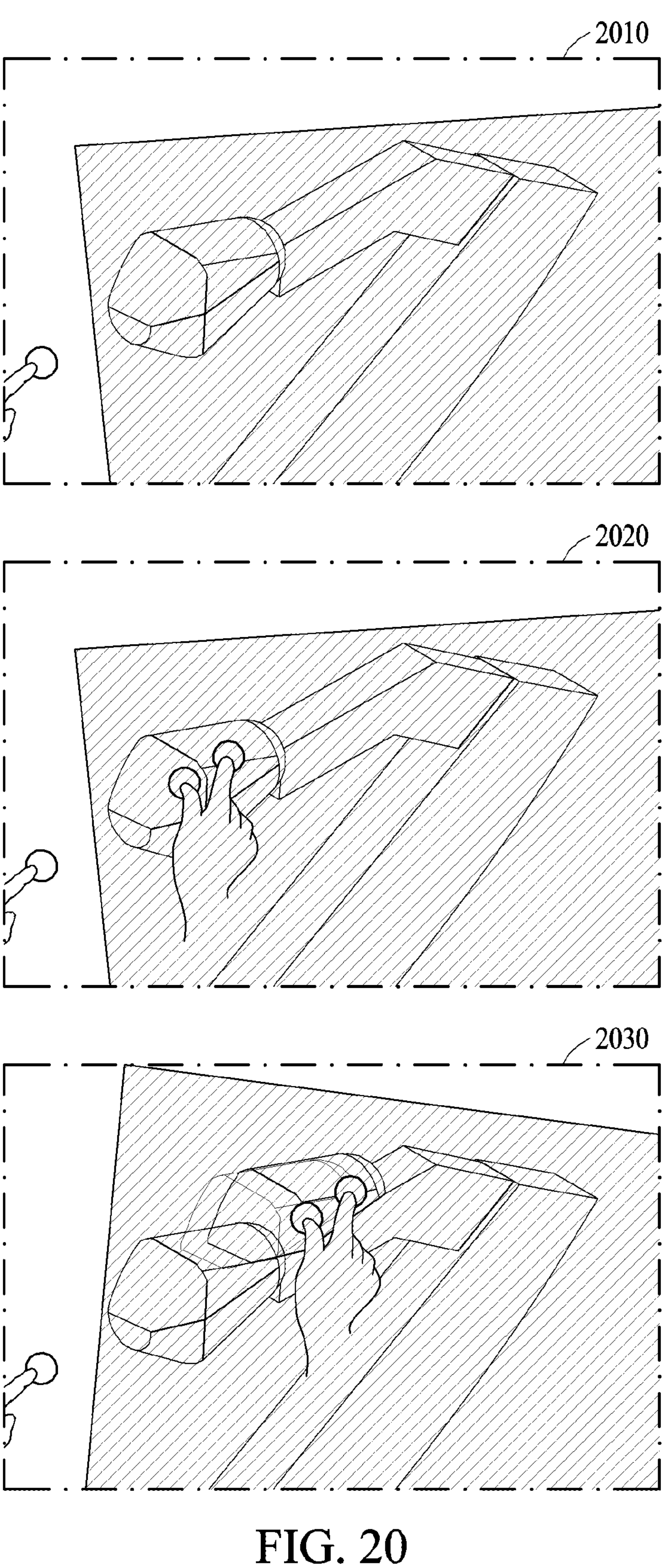

FIG. 20 illustrates an example of a control of generating a curved slider. In operation 2010, the user may touch the surrounding region set for the reference plane with the non-dominant hand. For example, the reference plane having the surrounding region to which a touch input by the user is input may penetrate or contact a part where a joint is to be generated. In operation 2020, when two tap and drag inputs are input by the dominant hand to a part overlapping the reference plane while the user is maintaining the touch input by the non-dominant hand to the surrounding region of the reference plane, the part may have a curved movement on the reference plane. In operation 2030, when the user repeatedly performs a curved movement on a part on the reference plane through a tap and drag input by the dominant hand, a movement afterimage of the part may form a trajectory, through which a curved slider where the part has a curved movement on the reference plane may be generated.

For example, the curved slider may be generated in a position where the reference plane passes through or contacts the part, and then may perform a curved movement on the part based on a part adjacent to the part. In addition, the curved slider may have a movement range according to a repetitive movement for joint generation. In other words, when a curved movement by the repetitive movement occurs within a certain range, the movement range of the curved slider may be limited to the range, but examples are not limited thereto.

Figure 21:
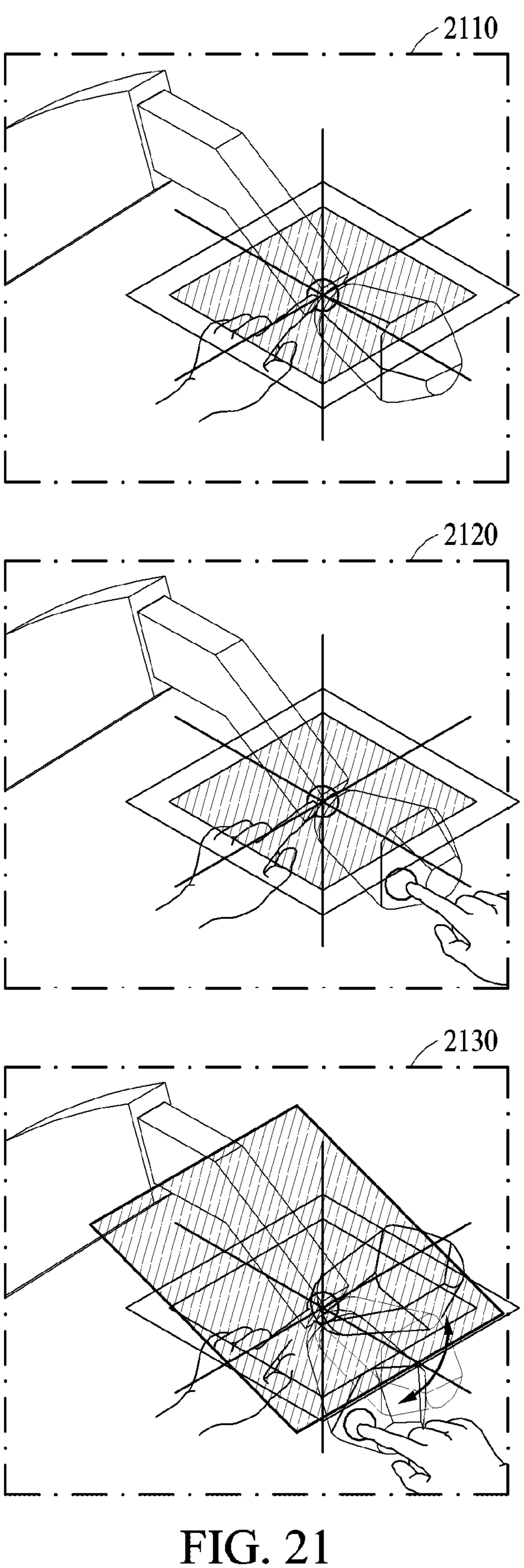

FIG. 21 illustrates an example of a control of generating a ball joint. In operation 2110, the user may touch a center point set for the reference plane with the non-dominant hand. For example, the reference plane having the center point to which a touch input by the user is input may penetrate or contact a part where a joint is to be generated. In other words, the center point to which the touch input is input may contact the part where the joint is to be generated. In operation 2120, when a tap and drag input is input by the dominant hand to a part overlapping the reference plane while the user is maintaining the touch input by the non-dominant hand to the center point of the reference plane, the part may spherically rotate around the center point of the reference plane. In operation 2130, when the user repeatedly spherically rotates a part around the center point of the reference plane through a tap and drag input by the dominant hand, a movement afterimage of the part may form a trajectory, through which a ball joint where the part spherically rotates around the center point of the reference plane may be generated.

For example, the ball joint may be generated in a position where the reference plane passes through or contacts the part or in the center point of the reference plane, and then may spherically rotate the part based on a part adjacent to the part. In addition, the ball joint may have a movement range according to a repetitive movement for joint generation. In other words, when a spherical rotation by the repetitive movement occurs within a certain range, the movement range of the ball joint may be limited to the range, but examples are not limited thereto.

Figure 22:
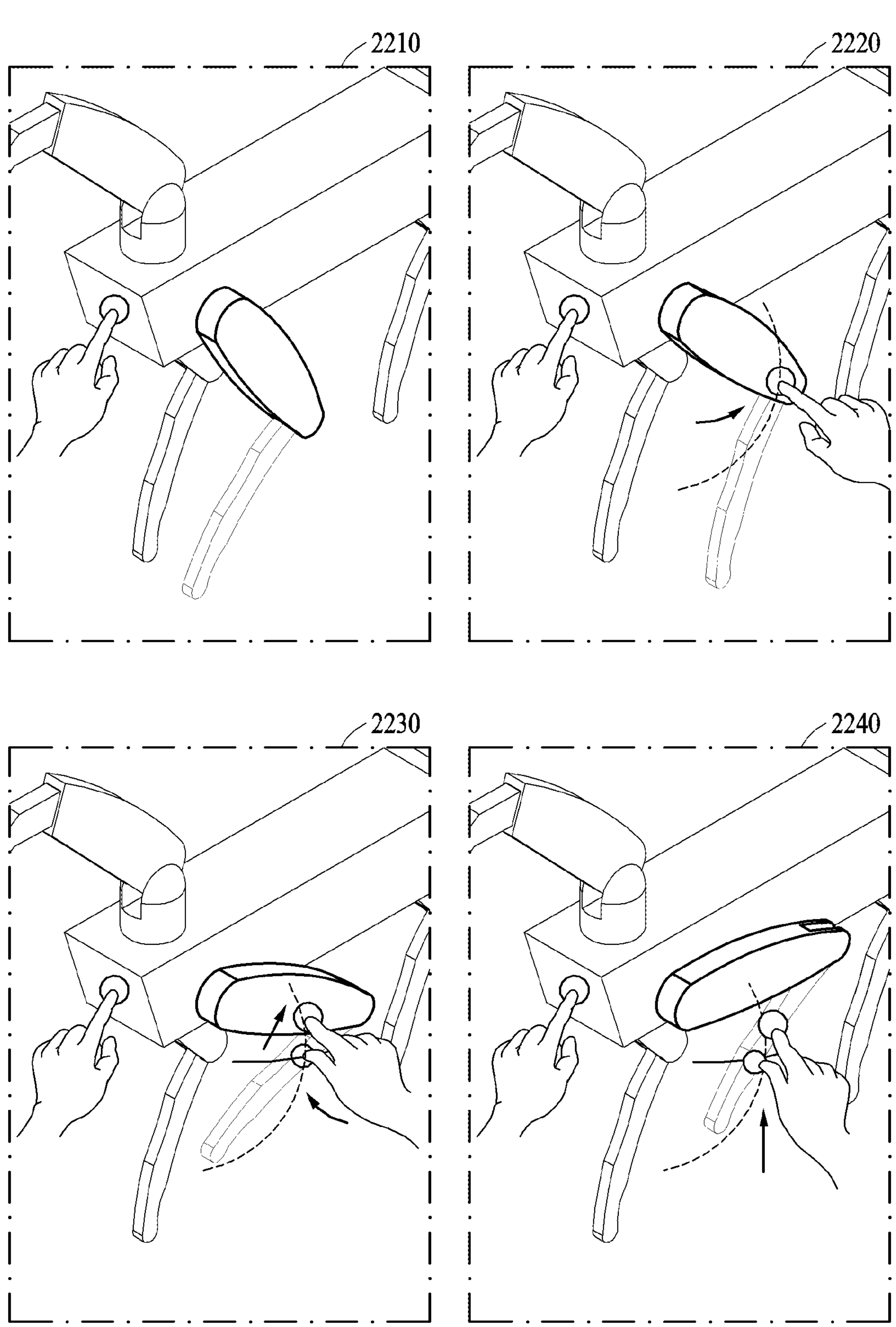
FIGS. 22 and 23 are diagrams each illustrating a posing operation according to an embodiment.
Figure 23:
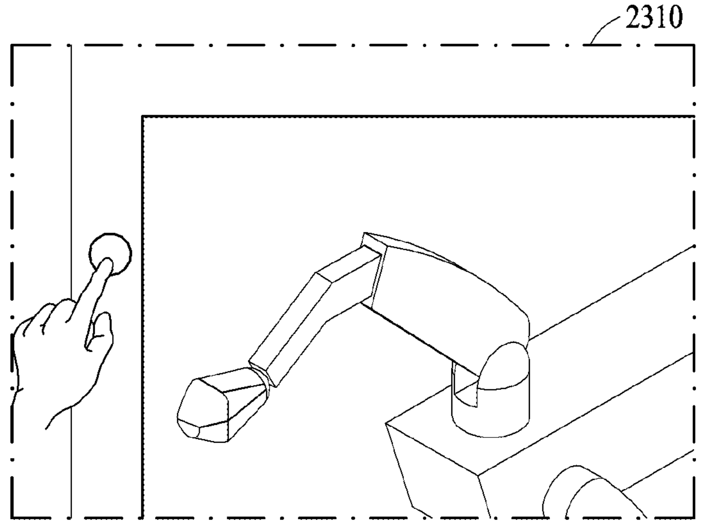
Figure 23:
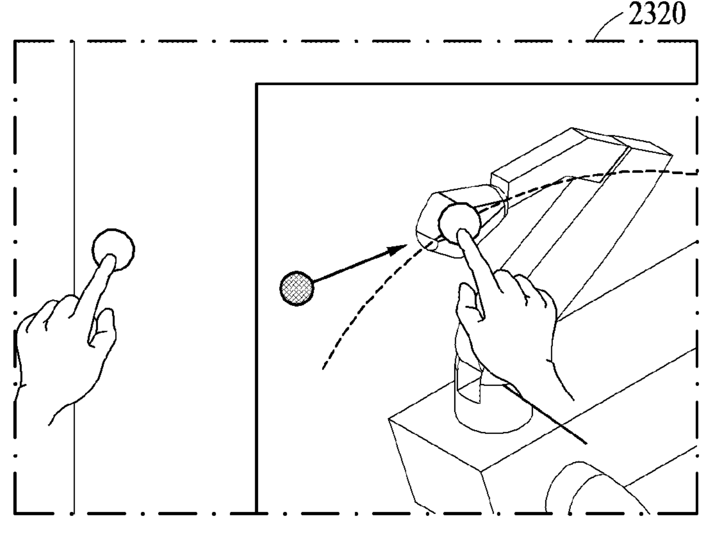

FIGS. 22 and 23 are diagrams each illustrating a posing operation according to an embodiment.

Like objects mentioned as examples for describing the double-handed multitouch interaction above, when physically manipulating an object having a joint, a user may hold a part which the user desires to fix with a non-dominant hand and may move a part which the user desires to move with a dominant hand, generally.

In this case, the holding position and strength of the dominant hand may vary depending on the type of the joint and a desired movement. For example, when rotating a certain part around a hinge joint, the user may hold a part that is sufficiently apart from a rotating axis in a part which the user desires to move with the dominant hand to exert a sufficient torque with a little force. On the other hand, when translating along a slider joint, to prevent the generation of an unnecessary torque, the user may hold a part where the distance of a line of action of force from a part which the user desires to move with the dominant hand to be minimized. In addition, the user may lightly hold a part when roughly controlling a pose and may tightly hold the part when precisely controlling the pose. The double-handed multitouch interaction which changes a pose by moving an object through forward kinematics and inverse kinematics by reflecting physical affordance may be implemented.

FIG. 22 illustrates an example of a first control over an object pose.

The forward kinematics may refer to rotating each joint of an object having multiple Joints and creating a desired pose. In operation 2210, the user may touch and fix any one of a plurality of parts of the object with the non-dominant hand. The fixed part may be referred to as a reference part since it is a reference for the movement of a target part which the user desires to move. In operation 2220, when a tap and drag input is input by the dominant hand to the part which the user desires to move while the user is maintaining a touch input by the non-dominant hand to the reference part, the target part may move according to the tap and drag input. If there is a plurality of joints between the reference part and the target part, a joint that is directly connected to the reference part among the plurality of joints may be activated to move the target part. In other words, parts between the reference part and the target part may move integrally as a whole. This movement control may allow the user to hold an optimal position to move a desired joint in a desired manner without considering a joint structure. In operation 2230, when a plurality of tap and drag inputs is input by the dominant hand respectively to target parts which the user desires to move while the user is maintaining a touch input by the non-dominant hand to the reference part, the target parts may move according to the corresponding tap and drag inputs.

The inverse kinematics may refer to moving multiple joints simultaneously such that a certain part of an object having the multiple joints is in a desired position and direction. In operation 2240, when a plurality of tap and drag inputs is input by the dominant hand to one target part which the user desires to move while the user is maintaining a touch input by the non-dominant hand to the reference part, an inverse kinematic calculation may be performed to designate a target point to move the target part and control a joint angle that matches it. In this case, all joints connected between the reference part and the target part may be activated. A point-shaped position constraint may be applied to the target part touched by the dominant hand, and a touch by the dominant hand may include the point-shaped position constraint and may be projected onto a 3D plane facing a normal direction of a joint directly connected to the reference part.

FIG. 23 illustrates an example of a second control over an object pose.

The inverse kinematics may also be used as a method of using the reference plane. In operation 2310, the user may touch one of elements (e.g., an axis, a surrounding region, a center point, etc.) of the reference plane with the non-dominant hand. In operation 2320, when a tap and drag input is input by the dominant hand to a target part overlapping the reference plane while the user is maintaining a touch input by the non-dominant hand to the element of the reference plane, the target part may move together with the reference plane according to the tap and drag input. This control may be useful for performing an inverse kinematic movement satisfying a certain condition like an end-effector of a robot moving along the reference plane.

Figure 24:
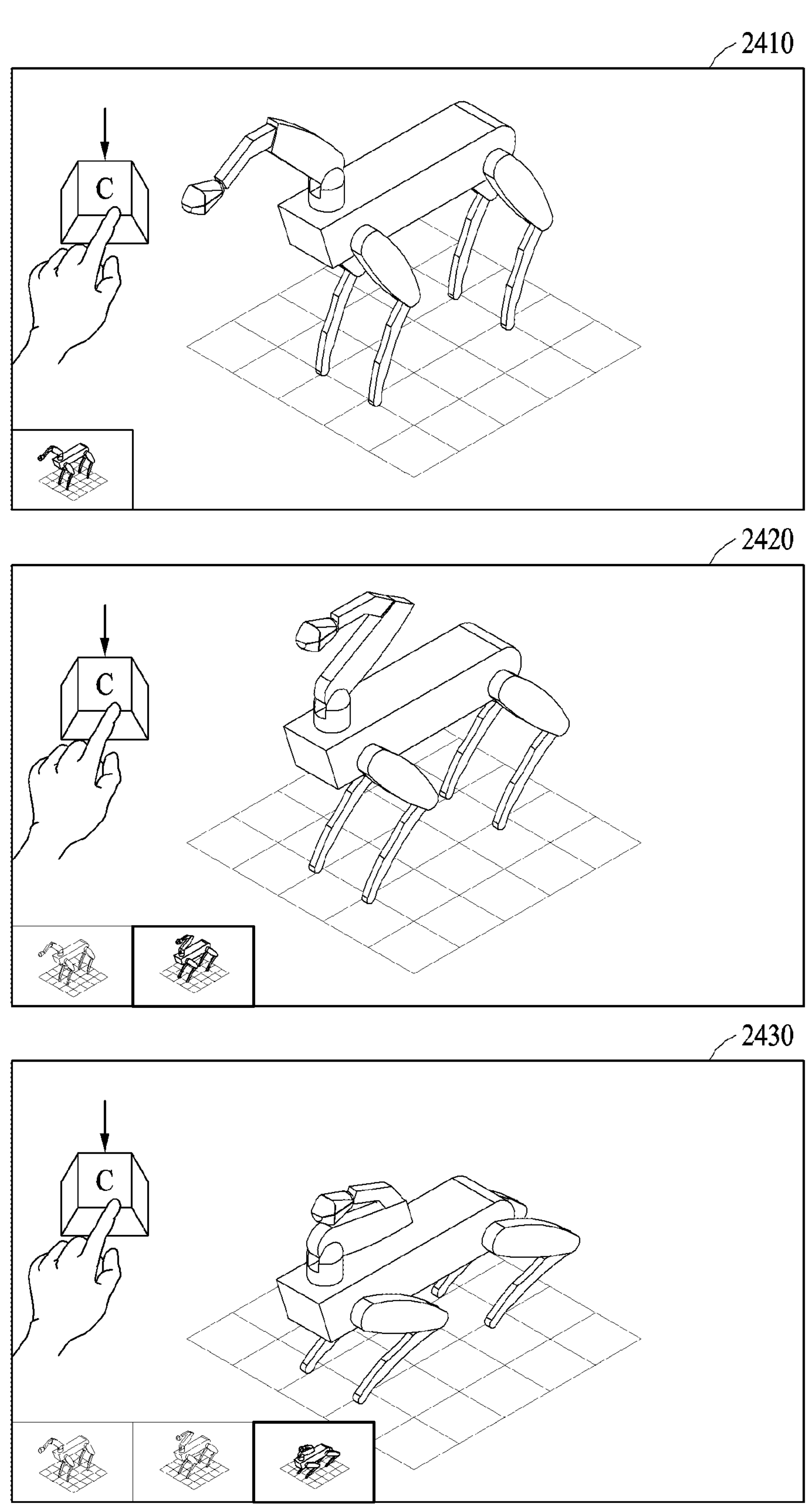
FIGS. 24 to 26 are diagrams each illustrating a filming operation according to an embodiment.
Figure 25:
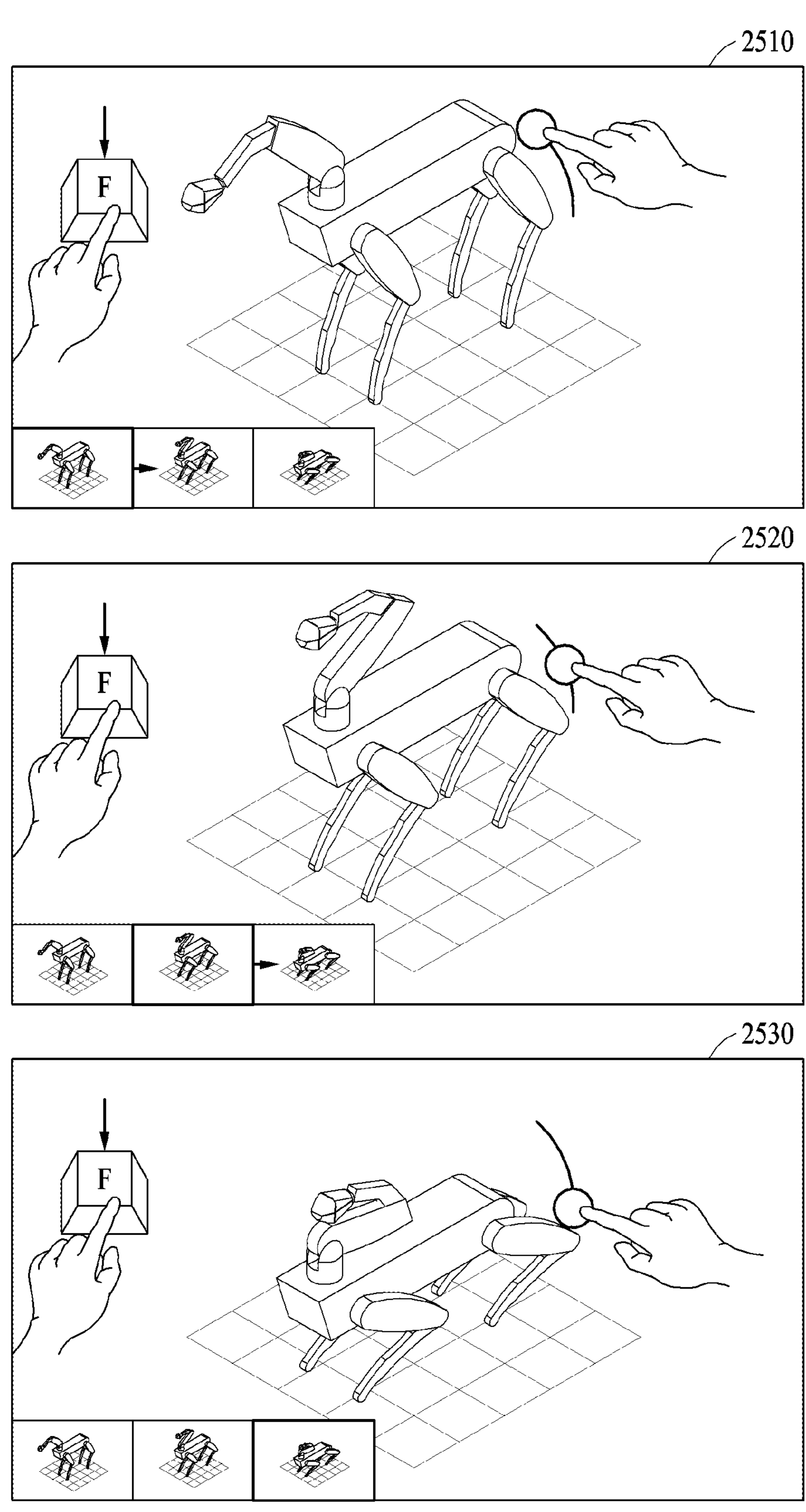
Figure 26:
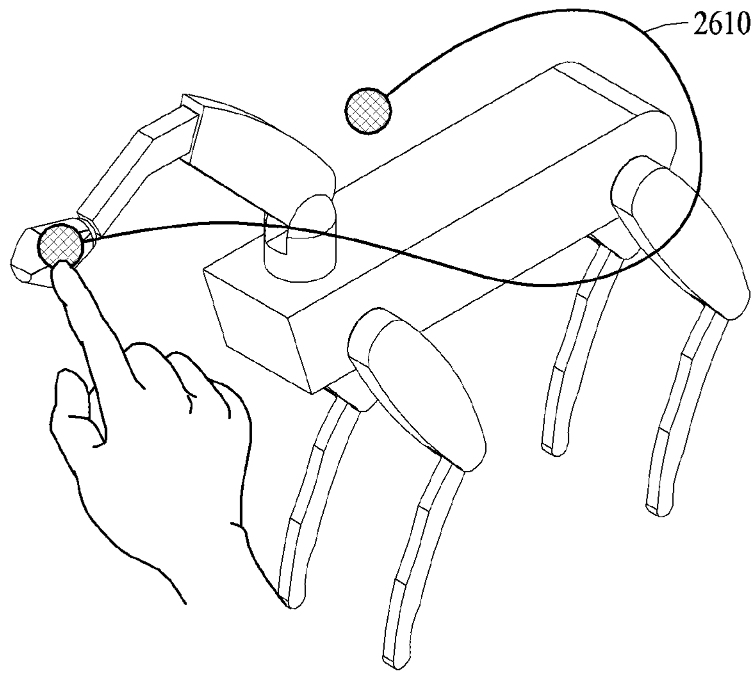

FIGS. 24 to 26 are diagrams each illustrating a filming operation according to an embodiment.

Like an introduction image of a product with multiple poses having a flowing camera movement, a user who designs an object having multiple poses may control the object to appear at a viewpoint where the multiple poses of the object and the movements among the poses stand out the most. In this case, a movement may refer to more than just switching an object from one pose to another pose in a use scenario. This is because the movement itself may closely give and receive influence to and from the other design elements, such as the shape (overall appearance) of an object, the segmentation (how the overall appearance is divided into parts) of the object, the structure (how the parts are connected to one another) of the object, and a pose (how a structural arrangement performs a certain function) of the object. For example, the user may consider what movement of a part having a certain shape is natural or what shape of a part having a certain movement is natural. An electronic device may support a key frame-based animation function such that the user may show multiple poses in sequential motion.

Referring to FIG. 24, in operations 2410 to 2430, the user may pose an object to take a desired pose, may adjust a camera to a desired viewpoint, and then may press a button indicating 'storing a key frame' to store a key frame. The stored key frame may be displayed in a thumbnail form in a bottom left of a display of the electronic device. The user may repeat such operations and may create a desired sequence of key frames.

For example, the user may touch a key frame and retrieve prestored pose and viewpoint, and a thumbnail may be activated. In this state, when the user changes a pose or a viewpoint, the thumbnail may be deactivated. The user may touch a thumbnail and drag it left or right to change an order of a key frame in a sequence or may drag the thumbnail up or down to delete the key frame. Key frames and thumbnails may be updated with the user modifying sketching, segmenting, or rigging. By doing so, the user may easily verify how their modifications are reflected on multiple poses and viewpoints.

Referring to FIG. 25, in operations 2510 to 2530, to create a movement to connect key frames, the user may input a tap and drag input by the dominant hand to a sketch line while pressing a button indicating 'following a trajectory' with the non-dominant hand. The tap and drag input may be performed along a trajectory displayed on the display.

Referring to FIG. 26, the user may use a key frame sequence such that the object may take multiple poses in sequential motion. When the user touches a part which the user desires to move while pressing the button indicating 'following a trajectory' in a state in which a certain key frame is activated, a trajectory 2610 to be drawn with the part moving continuously may be visualized. The user may move the part continuously between key frames by moving a touch along the trajectory 2610 at a desired speed. In this case, a frame box may display between which key frames a current frame is. The user may press a certain button additionally to record this movement.

Figure 27:
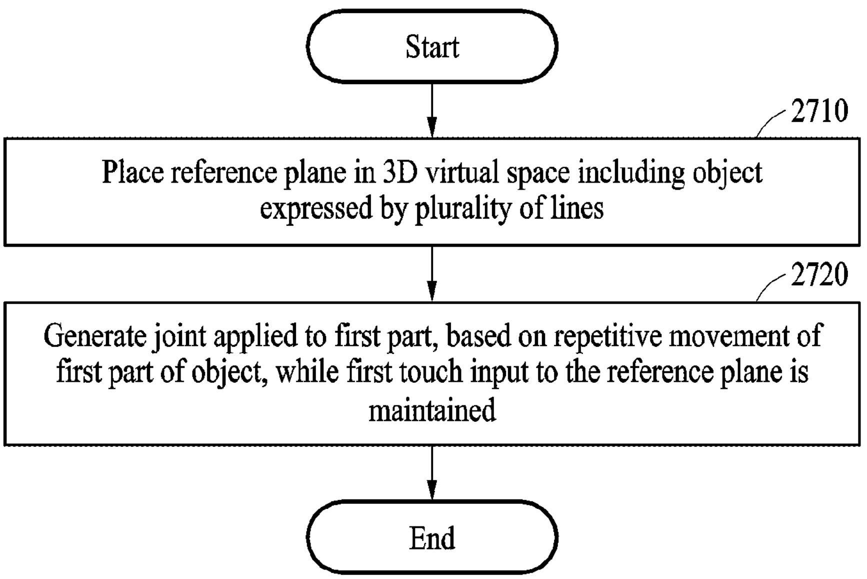
FIG. 27 is a diagram illustrating an operating method of an electronic device, according to an embodiment.

FIG. 27 is a diagram illustrating an operating method of an electronic device, according to an embodiment.

FIG. 27 illustrates the operating method performed by one or more processors of the electronic device.

In operation 2710, the electronic device may place a reference plane in a 3D virtual space including an object expressed by a plurality of lines.

The electronic device may rotate the reference plane around an axis according to one tap and drag input in response to the tap and drag input to a middle region set for the reference plane being input by the user while a first touch input by the user to the axis set for the reference plane is being maintained.

In addition, the electronic device may move the reference plane along the axis according to a plurality of tap and drag inputs in response to the tap and drag inputs to the middle region set for the reference plane being input by the user while the first touch input by the user to the axis set for the reference plane is being maintained.

In addition, the electronic device may move the reference plane according to a tap and drag input on the reference plane in response to the tap and drag input to the middle region set for the reference plane being input by the user while the first touch input by the user to a surrounding region set for the reference plane is being maintained.

In addition, the electronic device may move and/or rotate the reference plane according to a plurality of tap and drag inputs on the reference plane in response to the tap and drag inputs to the middle region set for the reference plane being input by the user while the first touch input by the user to a surrounding region set for the reference plane is being maintained.

In addition, the electronic device may orbit the reference plane around a center point according to one tap and drag input in response to the tap and drag input to the middle region set for the reference plane being input by the user while the first touch input by the user to the center point set for the reference plane is being maintained.

In addition, the electronic device may orbit and/or spin the reference plane around the center point according to a plurality of tap and drag input in response to the tap and drag inputs to the middle region set for the reference plane being input by the user while the first touch input by the user to the center point set for the reference plane is being maintained.

In operation 2720, the electronic device may generate a joint applied to a first part, based on a repetitive movement of the first part of the object overlapping the reference plane, while the first touch input by the user to the reference plane is being maintained. The joint may be determined based on the type of components of the reference plane to which the first touch input is input and the number of second touch inputs by the user to control the repetitive movement of the first part.

The second touch inputs may be a touch input to the first part overlapping the reference plane. The repetitive movement of the first part may be performed based on the reference plane.

In addition, the electronic device may generate a hinge joint where the first part rotates around the axis of the reference plane in response to the first touch input being input to the axis set for the reference plane and there being one second touch input.

In addition, the electronic device may generate a linear slider where the first part has a linear movement along the axis of the reference plane in response to the first touch input being input to the axis set for the reference plane and there being a plurality of second touch inputs. In addition, the electronic device may generate the linear slider where the first part has a linear movement on the reference plane in response to the first touch input being input to the surrounding region set for the reference plane and there being one second touch input.

In addition, the electronic device may generate a curved slider where the first part has a curved movement according to the repetitive movement in response to the first touch input being input to the surrounding region set for the reference plane and there being a plurality of second touch inputs.

In addition, the electronic device may generate a ball joint where the first part spherically rotates around the center point in response to the first touch input being input to the center point set for the reference plane and there being one second touch input or a plurality of second touch inputs.

In addition, the electronic device may generate the joint that connects a second part to the first part, in which the second part is adjacent to the first part to which the joint is applied and is a reference for the repetitive movement of the first part. The first part may be set to a child part of the second part, and the second part may be set to a parent part of the first part.

In addition, the electronic device may determine a movement range of the joint, based on the repetitive movement of the first part.

The electronic device may draw a line on the reference plane according to a pen input that is input by the user. The electronic device may set some lines selected by the user among the plurality of lines expressing the object as one part. The electronic device may determine a target part which the user desires to move among a plurality of parts of the object and a reference part that is a reference for a movement of the target part and may activate at least some of one or more joints between the reference part and the target part and move the target part by control of the user. The electronic device may control one or more movements of the plurality of parts of the object and determine a plurality of poses of the object and may control a movement of the object, changing from a first pose to a second pose among the plurality of poses, according to a tap and drag input that is input by the user.

The first touch input may be input by the user with a non-dominant hand and the second touch inputs may be input by the user with a dominant hand. However, examples are not limited to the foregoing examples, and various interaction methods may be applied without limitation.

The descriptions provided with reference to FIGS. 1 to 26 may apply to the operations shown in FIG. 27, and thus further detailed descriptions are omitted.

Figure 28:
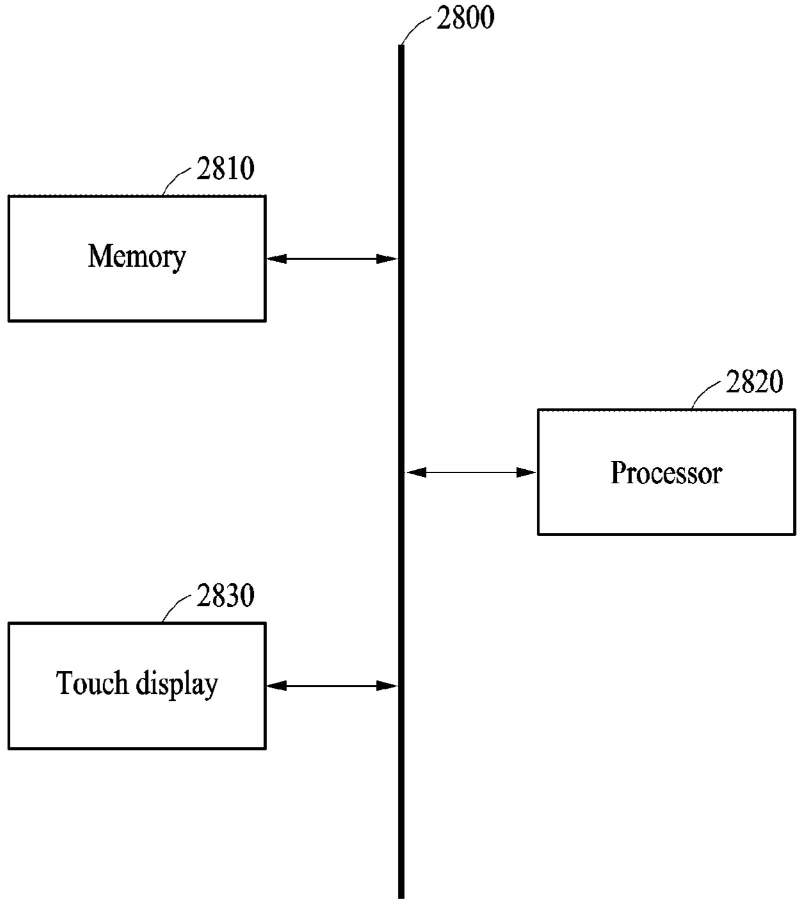
FIG. 28 is another diagram illustrating an electronic device according to an embodiment.

FIG. 28 is another diagram illustrating an electronic device according to an embodiment.

Referring to FIG. 28, an electronic device 2800 may include a memory 2810, a processor 2820, and a touch display 2830. The memory 2810, the processor 2820, and the touch display 2830 may communicate with one another via a bus.

The memory 2810 may include a computer-readable instruction. When an instruction stored in the memory 2810 is implemented by the processor 2820, the processor 2820 may perform the operations described above. The memory 2810 may include, for example, a volatile memory or a non-volatile memory.

The processor 2820 may be a device that executes instructions or programs or controls the electronic device 2800 and may include, for example, a central processing unit (CPU), a graphics processing unit (GPU), or the like. The processor 2820 illustrated in FIG. 28 may be one or more processors included in the electronic device 2800.

The processor 2820 may place a reference plane in a 3D virtual space including an object expressed by a plurality of lines and may generate a joint applied to a first part, based on a repetitive movement of the first part of the object overlapping the reference plane, while a first touch input by a user to the reference plane is being maintained. The joint may be determined based on the type of components of the reference plane to which the first touch input is input and the number of second touch inputs by the user to control the repetitive movement of the first part.

The touch display 2830 may display a screen determined by the processor 2820 and may receive a touch input, a pen input, or other inputs from the user.

In addition, the electronic device 2800 may process the operations described above.

The examples described herein may be implemented by using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other examples, and equivalents to the claims are also within the scope of the following claims.

The invention claimed is:

1. An electronic device comprising:

one or more processors configured to place a reference plane in a three-dimensional (3D) virtual space comprising an object expressed by a plurality of lines, and generate a joint applied to a first part, based on a repetitive movement of the first part of the object overlapping the reference plane, while a first touch input by a user to the reference plane is being maintained, wherein the joint is determined based on a component type of the reference plane to which the first touch input is input and the number of second touch inputs, which are configured to control the repetitive movement of the first part, by the user.

2. The electronic device of claim 1, wherein the second touch inputs are a touch input to the first part overlapping the reference plane.

3. The electronic device of claim 1, wherein the repetitive movement of the first part is performed based on the reference plane.

4. The electronic device of claim 1, wherein the one or more processors are further configured to generate a hinge joint where the first part rotates around an axis of the reference plane in response to the first touch input being input to the axis set for the reference plane and there being one second touch input.

5. The electronic device of claim 1, wherein the one or more processors are further configured to generate a linear slider where the first part has a linear movement along an axis of the reference plane in response to the first touch input being input to the axis set for the reference plane and there being a plurality of second touch inputs, or generate a linear slider where the first part has a linear movement on the reference plane in response to the first touch input being input to a surrounding region set for the reference plane and there being one second touch input.

6. The electronic device of claim 1, wherein the one or more processors are further configured to generate a curved slider where the first part has a curved movement according to the repetitive movement in response to the first touch input being input to a surrounding region set for the reference plane and there being a plurality of second touch inputs.

7. The electronic device of claim 1, wherein the one or more processors are further configured to generate a ball joint where the first part spherically rotates around a center point in response to the first touch input being input to the center point set for the reference plane and there being one second touch input or a plurality of second touch inputs.

8. The electronic device of claim 1, wherein the one or more processors are further configured to generate the joint configured to connect a second part to the first part, wherein the second part is adjacent to the first part to which the joint is applied and is a reference for the repetitive movement of the first part.

9. The electronic device of claim 8, wherein the first part is set to a child part of the second part, and the second part is set to a parent part of the first part.

10. The electronic device of claim 1, wherein the one or more processors are further configured to determine a movement range of the joint, based on the repetitive movement of the first part.

11. The electronic device of claim 1, wherein the one or more processors are further configured to rotate or translate the reference plane around an axis according to a tap and drag input in response to the tap and drag input to a middle region set for the reference plane being input by the user while the first touch input by the user to the axis set for the reference plane is being maintained.

12. The electronic device of claim 1, wherein the one or more processors are further configured to rotate and/or translate the reference plane on the reference plane according to a tap and drag input in response to the tap and drag input to a middle region set for the reference plane being input by the user while the first touch input by the user to a surrounding region set for the reference plane is being maintained.

13. The electronic device of claim 1, wherein the one or more processors are further configured to orbit and/or spin the reference plane around a center point according to a tap and drag input in response to the tap and drag input to a middle region set for the reference plane being input by the user while the first touch input by the user to the center point set for the reference plane is being maintained.

14. The electronic device of claim 1, wherein the one or more processors are further configured to control one or more movements of a plurality of parts of the object and determine a plurality of poses of the object, and control a movement of the object, changing from a first pose to a second pose among the plurality of poses, according to a tap and drag input that is input by the user.

15. The electronic device of claim 1, wherein the one or more processors are further configured to determine a target part which the user desires to move among the plurality of parts of the object and a reference part that is a reference for a movement of the target part, and activate at least some of one or more joints between the reference part and the target part and move the target part by control of the user.

16. The electronic device of claim 1, wherein the one or more processors are further configured to set some lines selected by the user among the plurality of lines expressing the object as one part.

17. The electronic device of claim 1, wherein the one or more processors are further configured to draw a line on the reference plane according to a pen input that is input by the user.

18. The electronic device of claim 1, wherein the first touch input may be input by a non-dominant hand of the user, and the second touch inputs may be input by a dominant hand of the user.

19. An operating method of an electronic device, the operating method comprising:

placing a reference plane in a three-dimensional (3D) virtual space comprising an object expressed by a plurality of lines; and generating a joint applied to a first part, based on a repetitive movement of the first part of the object overlapping the reference plane, while a first touch input by a user to the reference plane is being maintained, wherein the joint is determined based on a component type of the reference plane to which the first touch input is input and the number of second touch inputs, which are configured to control the repetitive movement of the first part, by the user.

20. A non-transitory computer-readable storage medium storing instructions that, when executed by a processor, cause the processor to perform the operating method of claim 19.

* * * * *